US012580621B2

(12) United States Patent (10) Patent No.: US 12,580,621 B2
Shahid et al. (45) Date of Patent: Mar. 17, 2026

(54) BREATHING RATE ESTIMATION USING RADIO FREQUENCY (RF) SENSING

(71) Applicant: QUALCOMM Incorporated, San Diego, CA (US)

(72) Inventors: Muhammad Osama Shahid, Madison, WI (US); Peyman Siyari, San Jose, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 18/160,534

(22) Filed: Jan. 27, 2023

(65) Prior Publication Data

US 2024/0259060 A1 Aug. 1, 2024

(51) Int. Cl.
*A61B 5/113* (2006.01)
*H04B 7/06* (2006.01)

(52) U.S. Cl.
CPC ................................. *H04B 7/0626* (2013.01)

(58) Field of Classification Search
None
See application file for complete search history.

(56) References Cited

U.S. PATENT DOCUMENTS

2020/0300972 A1* 9/2020 Wang ................... A61B 5/0002
2020/0397365 A1* 12/2020 Zhang ................... G16H 50/20
2021/0063537 A1 3/2021 Martinez et al.

FOREIGN PATENT DOCUMENTS

CN 114680840 A 7/2022
WO 2017156492 A1 9/2017

OTHER PUBLICATIONS

Hillyard P., et al., "Comparing Respiratory Monitoring Performance of Commercial Wireless Devices", arXiv:1807.06767v1 [eess.SP], Arxiv.Org, Cornell University Library, 201 Olin Library Cornell University Ithaca, NY 14853, Jul. 18, 2018, 13 pages, XP081249809, the whole document.
International Search Report and Written Opinion—PCT/US2024/010542—ISA/EPO—Apr. 29, 2024.

(Continued)

*Primary Examiner* — Minh Trang T Nguyen
(74) *Attorney, Agent, or Firm* — Weaver Austin Villenueve & Sampson LLP

(57) ABSTRACT

In some implementations, a device may obtain channel state information (CSI) corresponding to each subcarrier of a plurality of subcarriers in a set of RF transmissions comprising at least the plurality of subcarriers. The device may extract phase information of the CSI corresponding to each subcarrier and determine, for each subcarrier, a frequency spectrum from the phase information of the CSI, where the frequency spectrum comprises phase change values of the CSI corresponding to the respective subcarrier for a plurality of frequencies. The device may determine a breathing rate from the frequency spectrum of the CSI corresponding to a subcarrier set comprising one or more of the subcarriers, the breathing rate corresponding to a phase change value in the frequency spectrum within a predetermined range of frequencies for breathing rates. The device may output an indication of the determined breathing rate.

30 Claims, 16 Drawing Sheets

(56)     References Cited

OTHER PUBLICATIONS

Wang X., et al., "PhaseBeat: Exploiting CSI Phase Data for Vital Sign Monitoring with Commodity WiFi Devices", Proceedings of the International Conference on Distributed Computing Systems, IEEE Computer Society, US, Jun. 5, 2017, pp. 1230-1239, XP033123076, the whole document.

* cited by examiner

CSI processing architecture 300

1110

1150

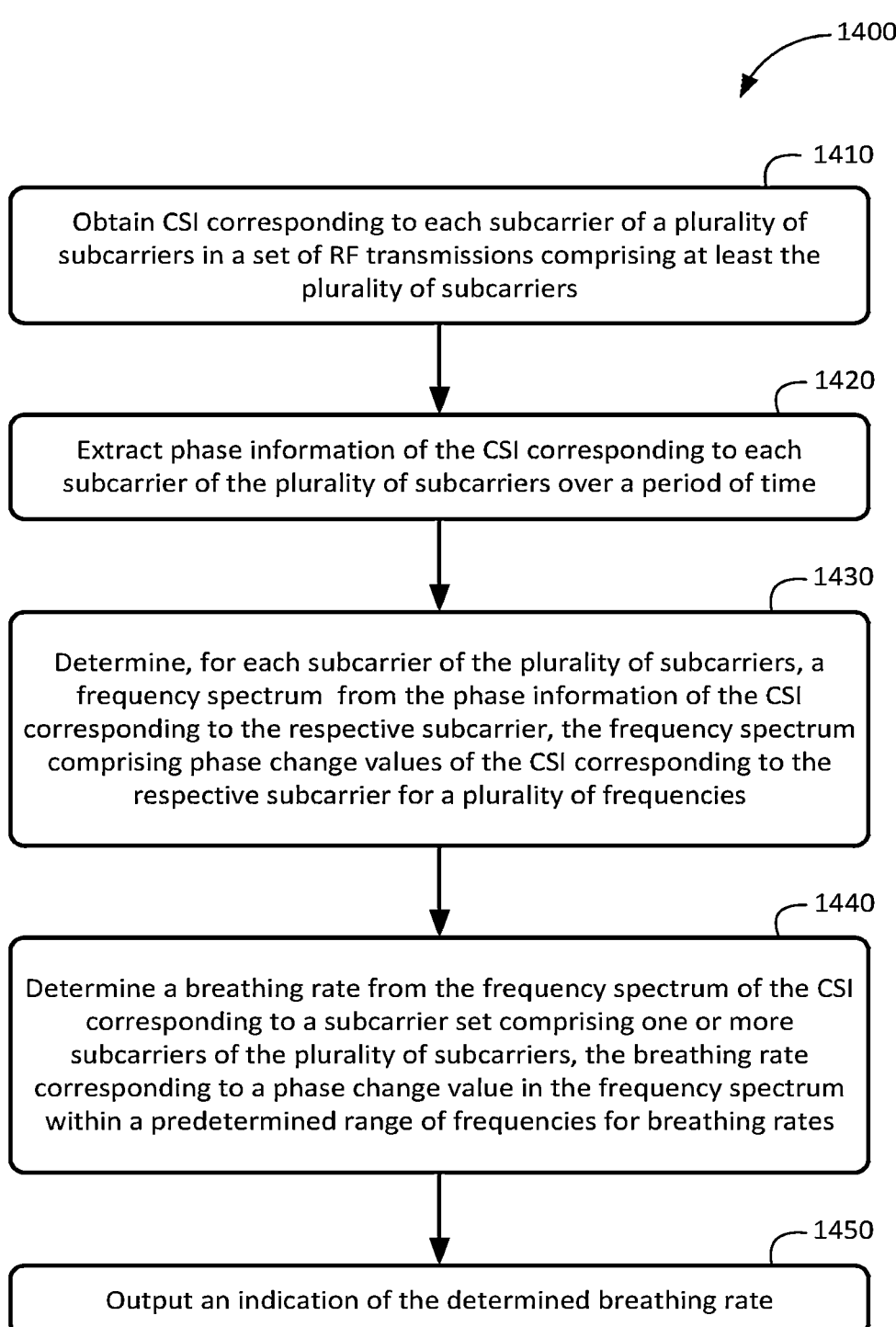

1400

1410

Obtain CSI corresponding to each subcarrier of a plurality of subcarriers in a set of RF transmissions comprising at least the plurality of subcarriers

1420

Extract phase information of the CSI corresponding to each subcarrier of the plurality of subcarriers over a period of time

1430

Determine, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies

1440

Determine a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates

1450

Output an indication of the determined breathing rate

FIG. 14

BREATHING RATE ESTIMATION USING RADIO FREQUENCY (RF) SENSING

BACKGROUND

1. Field of Disclosure

The present disclosure relates generally to object or motion detection, and more particularly, to the use of radio frequency (RF) sensing to determine a breathing rate.

2. Description of Related Art

The use of RF signals for wireless communication is ubiquitous. Wireless local area network (WLAN) communications (e.g., Wi-Fi), for example, are widely used in consumer, industrial, commercial, and other applications provide devices with Internet and/or other network connectivity. There are current developments in the industry to expand use of such RF signals beyond wireless communication to other applications.

BRIEF SUMMARY

Embodiments described herein provide for the estimation of a real-time breathing rate (e.g., of a human) in the presence of radio frequency (RF) signals, such as Wi-Fi signals. Channel state information (CSI) of RF signals may be obtained and phase information of the CSI can be analyzed to determine the breathing rate. Embodiments may utilize CSI from one subcarrier, a plurality of subcarriers, or all subcarriers used in a set of RF transmissions over a period of time.

An example method of radio frequency (RF) sensing for breathing rate determination, according to this disclosure, may comprise obtaining channel state information (CSI) corresponding to each subcarrier of a plurality of subcarriers in a set of RF transmissions comprising at least the plurality of subcarriers. The method also may comprise extracting phase information of the CSI corresponding to each subcarrier of the plurality of subcarriers over a period of time. The method also may comprise determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies. The method also may comprise determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates. The method also may comprise outputting an indication of the determined breathing rate.

An example device comprising: a memory, one or more processors communicatively coupled with the memory, wherein the one or more processors are configured to obtain channel state information (CSI) corresponding to each subcarrier of a plurality of subcarriers in a set of RF transmissions comprising at least the plurality of subcarriers. The one or more processors further may be configured to extract phase information of the CSI corresponding to each subcarrier of the plurality of subcarriers over a period of time. The one or more processors further may be configured to determine, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies. The one or more processors further may be configured to determine a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates. The one or more processors further may be configured to output an indication of the determined breathing rate.

An example apparatus for radio frequency (RF) sensing for breathing rate determination, according to this disclosure, may comprise means for obtaining channel state information (CSI) corresponding to each subcarrier of a plurality of subcarriers in a set of RF transmissions comprising at least the plurality of subcarriers. The apparatus further may comprise means for extracting phase information of the CSI corresponding to each subcarrier of the plurality of subcarriers over a period of time. The apparatus further may comprise means for determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies. The apparatus further may comprise means for determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates. The apparatus further may comprise means for outputting an indication of the determined breathing rate.

According to this disclosure, an example non-transitory computer-readable medium stores instructions for radio frequency (RF) sensing for breathing rate determination, the instructions comprising code for obtaining channel state information (CSI) corresponding to each subcarrier of a plurality of subcarriers in a set of RF transmissions comprising at least the plurality of subcarriers. The instructions further may comprise code for extracting phase information of the CSI corresponding to each subcarrier of the plurality of subcarriers over a period of time. The instructions further may comprise code for determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies. The instructions further may comprise code for determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates. The instructions further may comprise code for outputting an indication of the determined breathing rate.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 14 is a flowchart illustrating a method of RF sensing for breathing rate determination, according to an embodiment.

Figure 1:
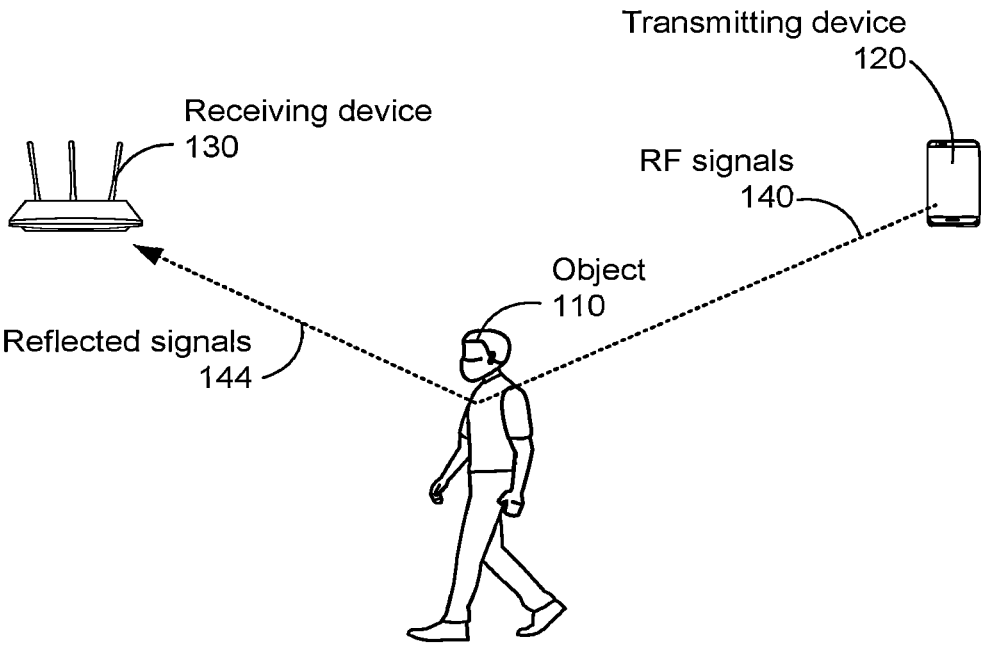
FIG. 1 an illustration basic scenario in which radio frequency (RF) sensing may be used to detect an object.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some examples in this disclosure may be based on wireless local area network (WLAN) communication according to the Institute of Electrical and Electronics Engineers (IEEE) 802.11 wireless standards, including those identified as Wi-Fi technologies. However, the described implementations may be implemented in any device, system or network that is capable of transmitting and receiving radio frequency (RF) signals according to any communication standard, such as any of the IEEE 802.11 standards, the Bluetooth® standard, ultra-wideband (UWB) and/or other technologies based on IEEE 802.15.x standards, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal and/or one or more received RF signals.

As noted, RF signals are frequently used for wireless communication, but were rarely used for other purposes. Embodiments herein leverage the use of RF signals, which may include signals from of a common wireless technology, such as a wireless local area network (WLAN) (e.g., Wi-Fi), to determine a breathing rate of a subject (e.g., a human) in the presence of the RF signals. Advantages for utilizing the embodiments herein may include, among other things, the determination of a breathing rate for presence detection, health analysis, and/or other applications. Moreover, this determination may be made using common equipment (e.g., Wi-Fi devices), without the need for specialized devices.

RF sensing is a process of using reflections of RF signals from an object to sense information regarding the object, such as location, movement, etc. In brief, RF signals comprising one or more waveforms, sequences, or packets are used for channel capture to obtain a Channel Impulse Response (CIR), a Channel Frequency Response (CFR), and/or other forms of Channel State Information (CSI) indicative of the presence and/or movement of the object. RF sensing may be performed using (i) a monostatic configuration in which a single device transmits and receives the RF signals, (ii) a bistatic configuration with a single transmitting device and a single receiving device, and/or (iii) a multistatic configuration having one or more transmitting devices and/or one or more receiving devices.

FIG. 1 illustrates a basic scenario in which RF sensing is used to detect an object 110. Here, bistatic RF sensing is performed by a transmitting device 120 and receiving device 130 although, as noted, other scenarios may have monostatic and/or multistatic configurations. Generally speaking, RF sensing may be used to detect the objects 110 by transmitting RF signals 140 (e.g., comprising one or more pulses) by the transmitting device 120 using one or more antennas. The RF signals 140 are reflected by the object 110 and reflected signals 144 (comprising the RF signals 140 reflected from the object 110) are then received by one or more antennas of the receiving device 130. The received RF signals can then be processed by receiving device using digital signal processing (DSP) techniques to determine the object's range. A processor, computer, or device communicatively coupled with the transmitting device 120 and receiving device 130 (including a processor of the transmitting device 120 or receiving device 130) may coordinate the timing of the transmittal and receipt of the RF signals. (The transmitting device 120 and receiving device 130 may be communicatively linked with a communication network, such as a WLAN (e.g., Wi-Fi), 5G cellular network, or combination thereof.) In some embodiments, the transmitting device 120 and/or receiving device 130 may have a plurality of antennas (WLAN radios, for example, commonly have 2 to 4 antennas) that may be respectively configured to enable beamforming at the transmitting device 120 and/or receiving device 130. Beamforming by the transmitting device 120 can enable the transmitting device 120 to transmit RF signals 140 in certain directions (e.g., azimuths and/or elevations). Beamforming by the receiving device 130 can enable the receiving device 130 to determine similar directional or angular information regarding received reflected signals 144. Thus, RF sensing can be used to "scan" a space or volume by using beamforming to use different Tx and/or Rx beams to respectively transmit RF signals 140 and/or receive reflected signals 144 in different directions (e.g., in different azimuth and/or elevation angles) across the space or volume. Further, changes in CSI over time are indicative of motion of the object 110. Thus, RF signals can be used to determine object location (e.g., angle and range), volume (or shape), movement, or a combination thereof.

It can be noted that the properties of the transmitted RF signals 140 (and reflected signals 144) may vary, depending on the technologies utilized. As noted, techniques provided herein can apply to WLAN technologies, which typically operate at 2.4, 5, and 6 GHz, but may include frequencies ranging from 900 MHz to 60 GHz, for example. This includes, for example, frequencies utilized by the 802.11 ad Wi-Fi standard (operating at 60 GHz). That said, some embodiments may utilize RF frequencies outside this range. Because RF sensing may be performed in the same frequency bands as communication, the hardware and/or software components (e.g., of a wireless modem in the transmitting device 120 and/or receiving device 130) used for communication also may be used for RF sensing. Techniques for RF sensing described herein may utilize various types of RF signals 140, such as Zadoff sequences, Orthogonal Frequency-Division Multiplexing (OFDM) Long Training Field (LTF)-like symbols for channel capture to determine the presence and/or movement of the object 110. Because the RF sensing system may be capable of sending RF signals for communication (e.g., using IEEE 802.11 communication technology), embodiments may leverage channel estimation used in communication for performing RF sensing as provided herein. Accordingly, RF signals 140 may comprise the same wireless pulses and/or packets as those used for channel estimation in communication.

Figure 2A:
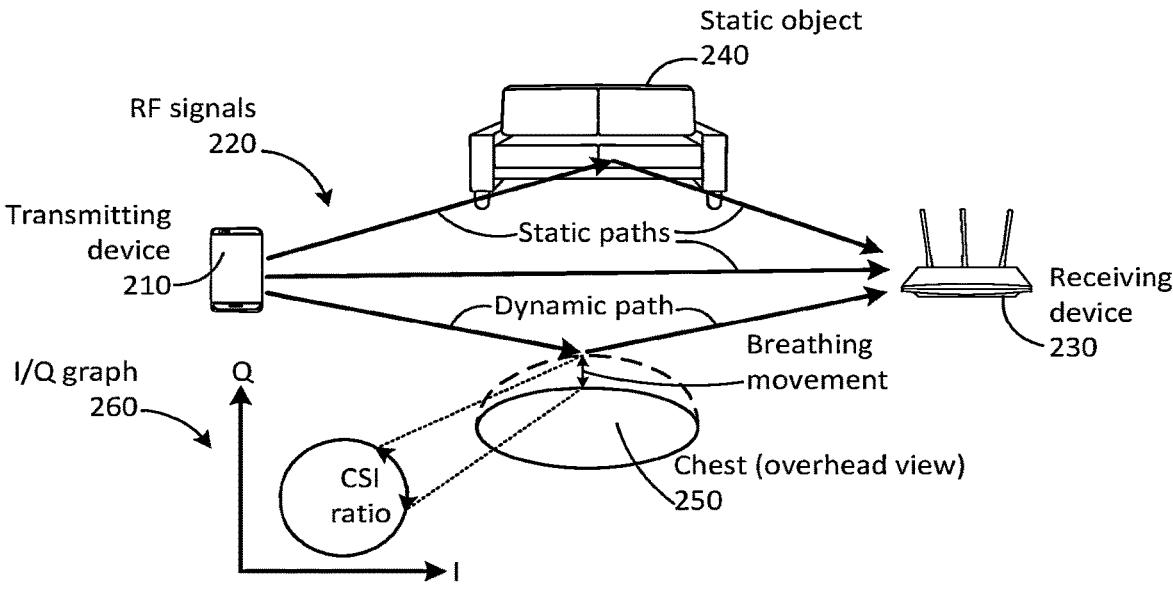
FIG. 2A is a diagram illustrating the basic principles of RF detection of human breathing, according to some embodiments.
Figure 2B:
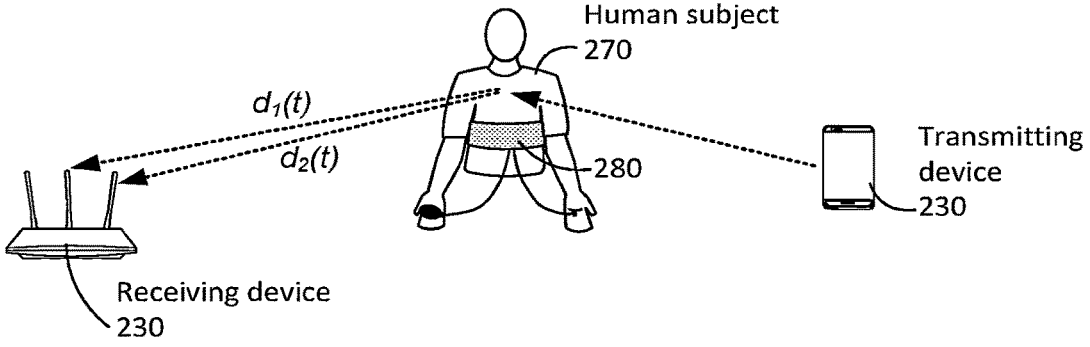
FIG. 2B illustrates an example of how the scenario in FIG. 2A may be implemented, according to some embodiments.

Because RF sensing can detect movement, it has the potential to detect types of movement. FIGS. 2A and 2B, described below, illustrate how this can be done with respect to human breathing.

FIG. 2A is a diagram illustrating the basic principles of RF detection of human breathing. In this example, a transmitting device 210 transmits RF signals 220 over a period of time to a receiving device 230. As illustrated, the RF signals 220 may take many of paths from the transmitting device 210 to the receiving device 230, including static paths comprising a direct (e.g., line of sight (LOS)) path and a path reflected by a static object 240. As with other figures herein, FIG. 2A is provided as a non-limiting example. Although transmitting device 210 is illustrated as a mobile phone and receiving device 230 is illustrated as an access point, an access point may operate as a transmitting device and a mobile phone may operate as a receiving device. In general, transmitting and/or receiving device types may vary; virtually any wireless device type (e.g., Wi-Fi) device may operate as a transmitting device 210 and/or receiving device 230.

Additionally, however, RF signals 220 may take a dynamic path reflected by a chest 250 of a (e.g., stationary) human subject. Specifically, as the subject breathes, the human chest 250 moves in and out, changing the length of the dynamic path taken by the RF signals 220. The RF signals that take the dynamic path and are received by the receiving device 230 can be described mathematically as:

$$H(f, t) = Ae^{-j2\pi \frac{d(t)}{\lambda}} \qquad \text{(Eqn. 1)}$$

where A is attenuation, and d(t) is propagation length of the dynamic path taken by the RF signals.

As the subject breathes, the dynamic path length increases or decreases almost sinusoidally, with the movement of the chest 250. In a corresponding I/Q graph 260 of the received signals, CSI rotates along a circular arc clockwise or counterclockwise (as shown in the I/Q graph 260 in FIG. 2A) corresponding to inhalation or exhalation. The phase of CSI captures the changes in dynamic path length.

FIG. 2B illustrates an example of how the scenario in FIG. 2A may be implemented, according to some embodiments. Here, the transmitting device 210 transmits RF signals over a period of time in the presence of a human subject 270. As illustrated, the receiving device 230 receives RF signals reflected from the human subject 270 at two antennas. As described hereafter, the usage of two antennas can facilitate the extraction of phase data from the CSI of the RF signals. In experimentation, to establish a ground truth with respect to breathing rate, the human subjects 270 may wear an apparatus 280 that measures the subject's breathing independent of the presence of RF signals.

Figure 3A:
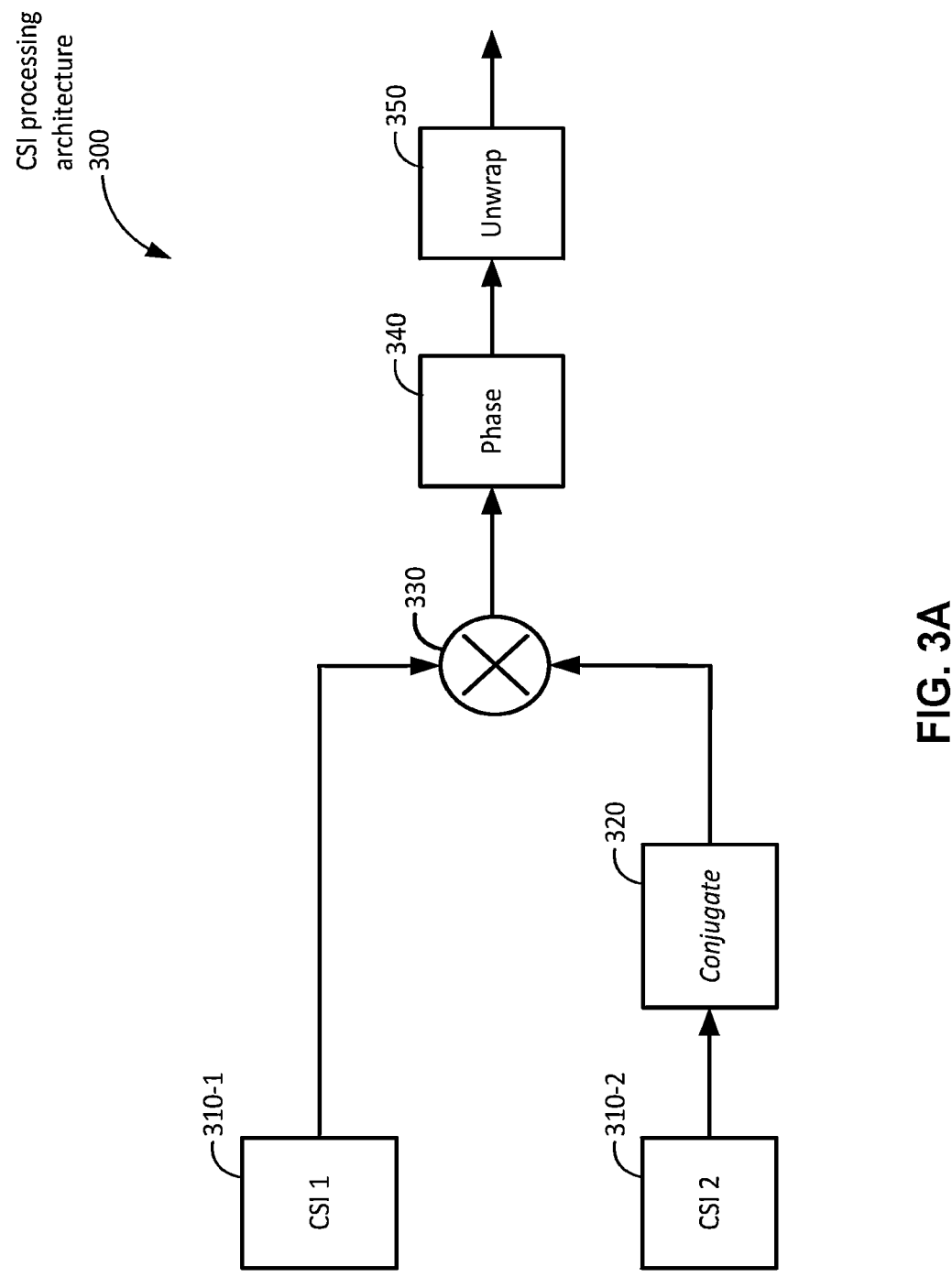
FIG. 3A is a diagram of channel state information (CSI) processing architecture that may be used for extracting phase information from CSI, according to some embodiments.

FIG. 3A is a diagram of CSI processing architecture 300 that may be used for extracting phase information from CSI, according to some embodiments. In this architecture 300 a first and second antenna respectively receive CSI at blocks 310-1 and 310-2 (collectively and generically referred to as blocks 310). Without compensating for frequency offset, it can be difficult to extract any phase information from CSI inputs at block 310. An example phase response at a block 310 is illustrated in FIG. 3B.

Figure 3B:
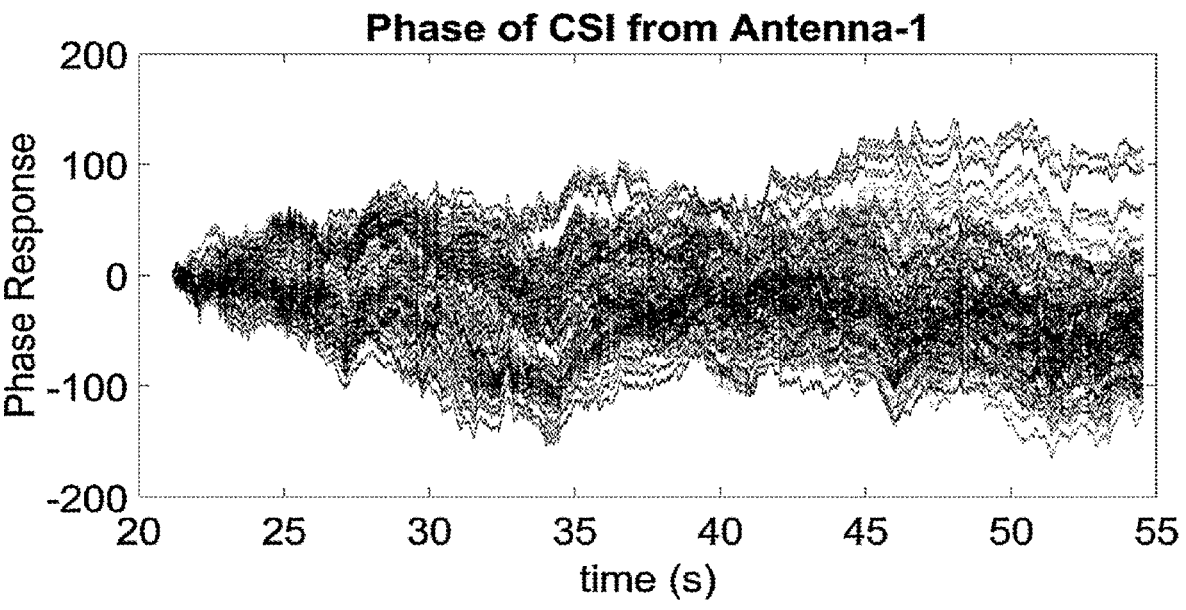
FIG. 3B is a graph of example CSI phase information, prior to frequency offset compensation.

In FIG. 3B, phase responses of all 128 subcarriers of a Wi-Fi signal are plotted over a period of over 30 seconds. As can be seen, the phase response increases over time, showing how a frequency offset at the receiver and cause the phase response to drift over time, making it difficult to extract any true phase information.

Returning to FIG. 3A, the CSI processing architecture 300 compensates for frequency offset by multiplying the CSI from a first antenna (CSI 1 at block 310-1) with the conjugate of the CSI from a second antenna (CSI 2 at block 310-2). (The conjugation of the CSI from the second antenna is illustrated at block 320, and the multiplication is illustrated at item 330). Using Eqn. 1, the CSI 1 for all subcarriers at the first antenna at a time t can be represented by:

$$x_1(n, t) = e^{-j\phi(t)} \sum_{n=1}^{N} A_1 e^{-j2\pi \frac{d_1(t)}{\lambda}}, \qquad \text{(Eqn. 2)}$$

Where is $x_1$ is CSI 1, n is a subcarrier, and N is the total number of subcarriers. The equivalent CSI 2 at the second antenna can be represented by:

$$x_2(n, t) = e^{-j\phi(t)} \sum_{n=1}^{N} A_2 e^{-j2\pi \frac{d_2(t)}{\lambda}}. \qquad \text{(Eqn. 3)}$$

Figure 3C:
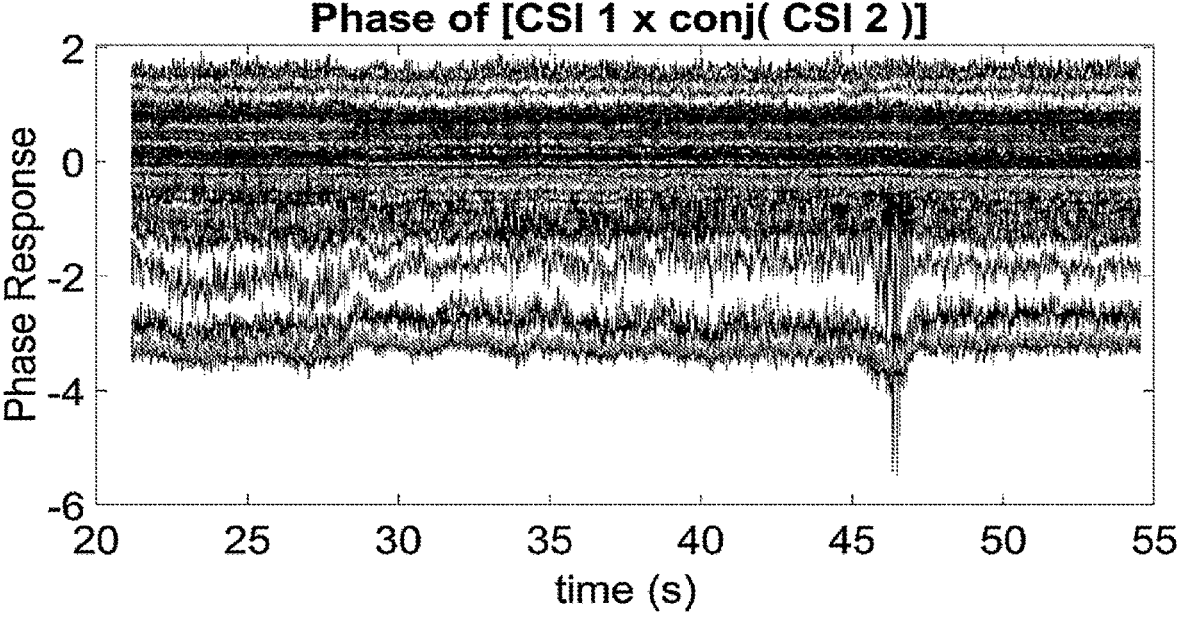
FIG. 3C is a graph of example CSI phase information, after frequency offset compensation, according to some embodiments.

According to some embodiments, because both antennas share the same oscillator and therefore have the same frequency offsets, the multiplication of the CSI of one antenna with the conjugate of another antenna in a manner illustrated in FIG. 3A (e.g., $x_1(n, t) \times \text{conj}(x_2(n, t))$ cancels our the residual frequency offset term, $e^{-j\phi(t)}$, of both Eqn. 2 and Eqn. 3. After phase determination (block 340 in FIG. 3A) of the result of the multiplication and unwrapping of phase information (block 350, to determine true phase magnitude), the true phase response of the input CSI can be determined. To be clear, the unwrapping at block 350 can determine the true phase magnitude by adding or subtracting appropriate multiples of 2pi to each phase in order to make the phase continuous across subcarriers. An example of the resulting output corresponding to the CSI of FIG. 3B is illustrated in FIG. 3C.

It can be noted that alternative embodiments may utilize a different architecture than the CSI processing architecture 300 of FIG. 3A to provide the same functional result: determine a phase difference between CSI of the two antennas. An alternative architecture may compute the phase of the CSI of a first antenna and the phase of the CSI of a second antenna, then compute the difference of the two phases. This alternative architecture gives an identical result as the CSI processing architecture 300 of FIG. 3A, which is the phase difference between the two antennas. Other embodiments may employ yet other techniques for determining a phase difference between the two antennas. Regardless of how phase difference between the two antennas is determined, the phase difference may then be further processed to determine a breathing rate, as described in the embodiments below.

Figure 4:
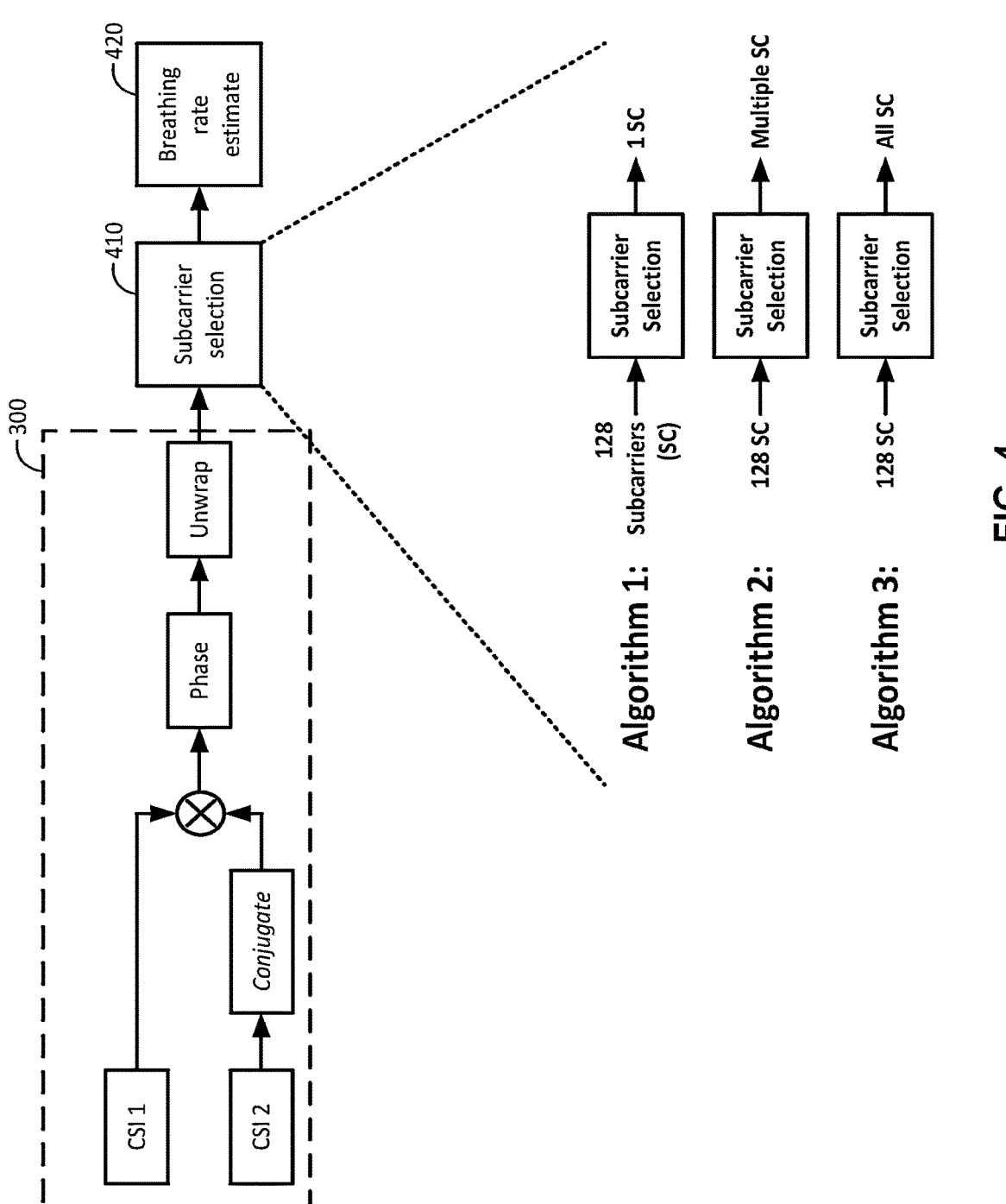
FIG. 4 is an illustration of how the output of the architecture in FIG. 3 can be further processed to determine a respiration estimate or breathing rate.

FIG. 4 is an illustration of how the output of the architecture 300 (e.g., of FIG. 3A) can be further processed to determine a respiration estimate or breathing rate. Here, the output of the architecture 300 (e.g., phase information as illustrated in FIG. 3C) may be used select one or more subcarriers to use for breathing rate determination, as shown at block 410. The CSI corresponding to the selected subcarrier(s) is then further processed to determine the breathing rate, as shown at block 420.

As shown in FIG. 4, one or more of three different algorithms may be used, depending on desired functionality. Each algorithm uses a plurality of subcarriers (e.g., all 128 subcarriers of a Wi-Fi transmission) as an input. According to a first algorithm ("algorithm 1"), a single subcarrier is selected; according to a second algorithm ("algorithm 2"), multiple subcarriers are selected; and according to a third algorithm ("algorithm 3"), all subcarriers are used.

The selection of which algorithm to use may depend on the scenario. For example, a single subcarrier can be used to determine a breathing rate in a relatively empty environment. However, if the environment has multiple objects (furniture, a ceiling fan, etc.) multiple subcarriers may be used. In some scenarios, it may be most efficient to use all subcarriers. With this in mind, some embodiments may utilize algorithm 2 if algorithm 1 is not successful at determining a breathing rate, and further use algorithm 3 if algorithm 2 is not successful at determining a breathing rate. Additionally or alternatively, a determination of which algorithm to use may be based on an analysis of the CSI itself (once processed by the architecture 300). Additional details regarding this determination, and the algorithms, are provided hereafter.

It can be noted that aspects of the output of the architecture 300 and subcarrier selection at block 410 may vary, depending on desired functionality. According to some embodiments, for example, CSI may be sampled at a rate of 100 Hz (e.g., per carrier). Alternative embodiments may utilize a higher sampling rate (e.g., 200 Hz, 500 Hz, 1 kHz, etc.) or a lower sampling rate (e.g., 50 Hz, 20 Hz, 10 Hz, etc.). Additionally or alternatively, the time period over which CSI is analyzed may vary. For example, according to some embodiments, an analysis of the CSI for the previous X period of time maybe output every Y seconds, where the period of time (X) comprises a window of 10 seconds, 20 seconds, 30 seconds, 60 seconds, 90 seconds, or 120 seconds, etc., and the refresh rate (Y) is 0.2 s, 0.5 s, 1 s, 2 s, 5 s, or 10 s, etc. According to some embodiments, values for X and/or Y may be predefined, or may be defined by a user, device, or application. According to some embodiments, one or both of these values may change if/when breathing is detected (e.g., to modify refresh rate and/or the period of time to better track breathing).

Figure 5:
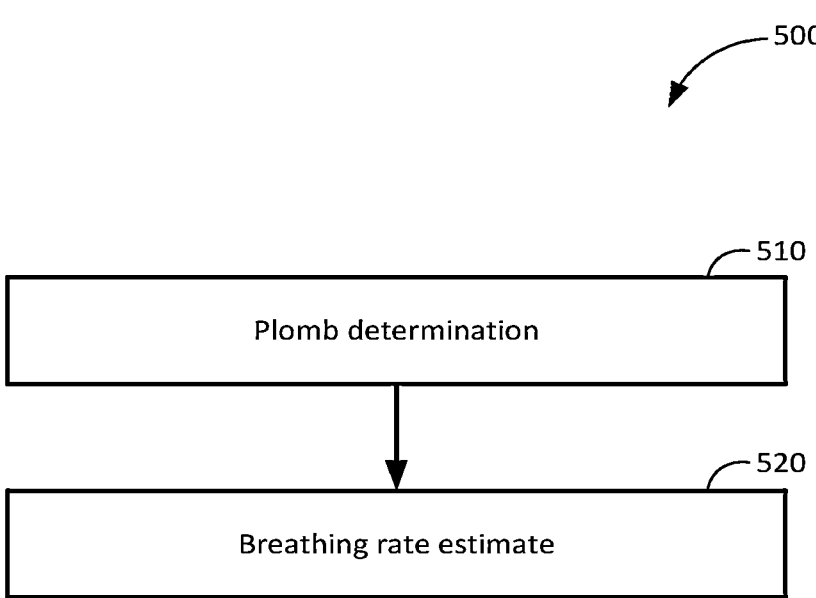
FIG. 5 is a flow diagram of the method of using a single subcarrier to determine a breathing rate, according to some embodiments, corresponding to algorithm 1 of FIG. 4.

FIG. 5 is a flow diagram of the method 500 of using a single subcarrier to determine a breathing rate, according to an embodiment. This method 500 may be performed by software and/or hardware components of a receiving device (e.g., receiving device 230 of FIGS. 2A and 2B) having two antennas and processing incoming CSI from the two antennas in accordance with FIG. 4, for example.

The functionality at block 510 comprises determining a plomb function. As a person of ordinary skill in the art will appreciate, using plomb function (or similar frequency spectrum determination and analysis) on the phase response of the CSI received by the receiver allows for a frequencydomain analysis of movement (Doppler shift) at different rates/frequencies phase change. According to some aspects, a plomb function is essentially a Fast Fourier Transform (FFT) plot of the unwrapped CSI output by the processing architecture 300 for period of time.

Figure 6:
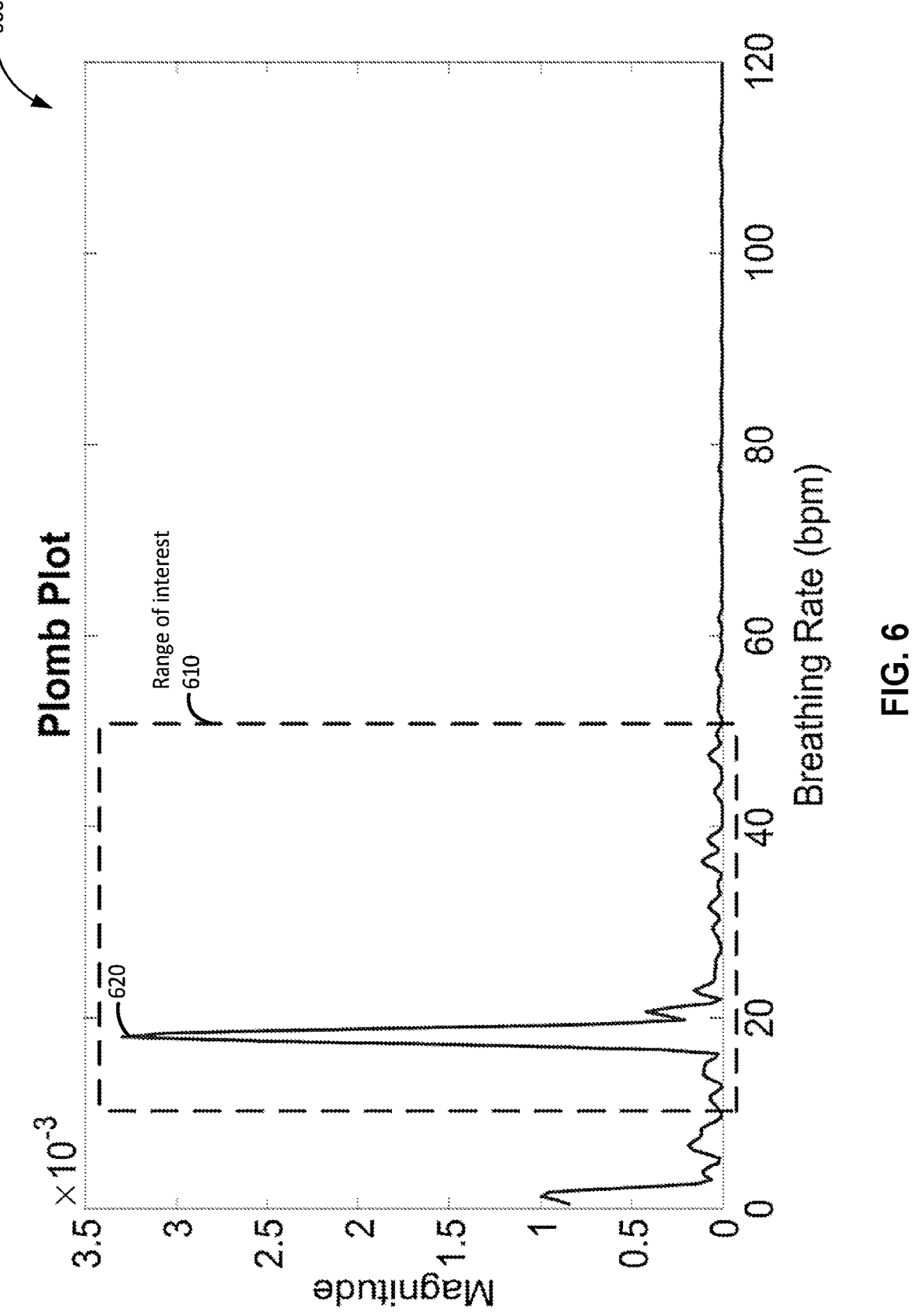
FIG. 6 is a graph of an example plomb plot of a single subcarrier, according to some embodiments.

FIG. 6 is a graph 600 of an example plomb plot of a single subcarrier, according to an embodiment. As can be seen, graph 600 plots the magnitude of phase change over frequency (breathing rate or breaths per minute (bpm)). As shown in FIG. 6, there may be a range of interest 610 that can be analyzed, reflective of human breathing rates. As such, data in the range of interest 610 may be analyzed more thoroughly, whereas data outside the predetermined range of interest 610 may be disregarded (for the most part). A bpm at which the most movement (Doppler shift) occurs result in a peak value (e.g., peak 620) in the data. Although the range of interests 610 in FIG. 6 corresponds with a breathing rate of approximately 10-50 bpm, alternative embodiments may have different ranges, depending on desired functionality.

Returning to FIG. 5, once a plomb determination for all subcarriers has been made at block 510, the method 500 may then proceeded to determining a breathing estimate, as indicated at block 520. In the algorithm utilizing a single subcarrier (e.g., algorithm 1 of FIG. 4), an analysis of the plomb for all subcarriers can be made to determine the breathing estimate. In particular, a Breathing to Noise Ratio (BNR) for the CSI of each subcarrier can be calculated from the plomb determination based on a range of interest (e.g., range of interest 610 of FIG. 6) as follows:

$$\text{Breathing to Noise Ratio}(BNR) = \frac{\text{Energy in range of interest}}{\text{Energy in total spectrum}} \quad \text{(Eqn. 4)}$$

In FIG. 6, for example, the BNR would be the ratio of energy within the range of interest 610 to the energy of the entire graph 600.

According to some embodiments, the subcarrier having the CSI with the highest BNR value of all subcarriers may be selected for breathing rate determination. Once the sub-carrier having the CSI with the highest BNR value is selected, a bpm of a peak value within the range of interest in the plomb plot of the subcarrier can be the determined breathing rate. In FIG. 6, for example, peak 620 represents a maximum value within the range of interest 610, and therefore the breathing rate may correspond with the bpm of the peak 620: approximately 17 bpm.

According to some embodiments, a threshold value may be used for BNR and/or a peak plomb plot value, to help reduce the likelihood of a false positive. That is, if the BNR of the subcarrier having the CSI with the highest BNR value is below a threshold value for BNR, and/or if a maximum amplitude value within a range of interest of the selected subcarrier is below a threshold amplitude value, then the breathing rate determination process may conclude that breathing is not detected. This may mean that either no breathing human is present, or that a breathing rate cannot be detected using a single subcarrier. In such instances, some embodiments may then utilize algorithm 2: multiple subcar-rier breathing rate detection.

Figure 7:
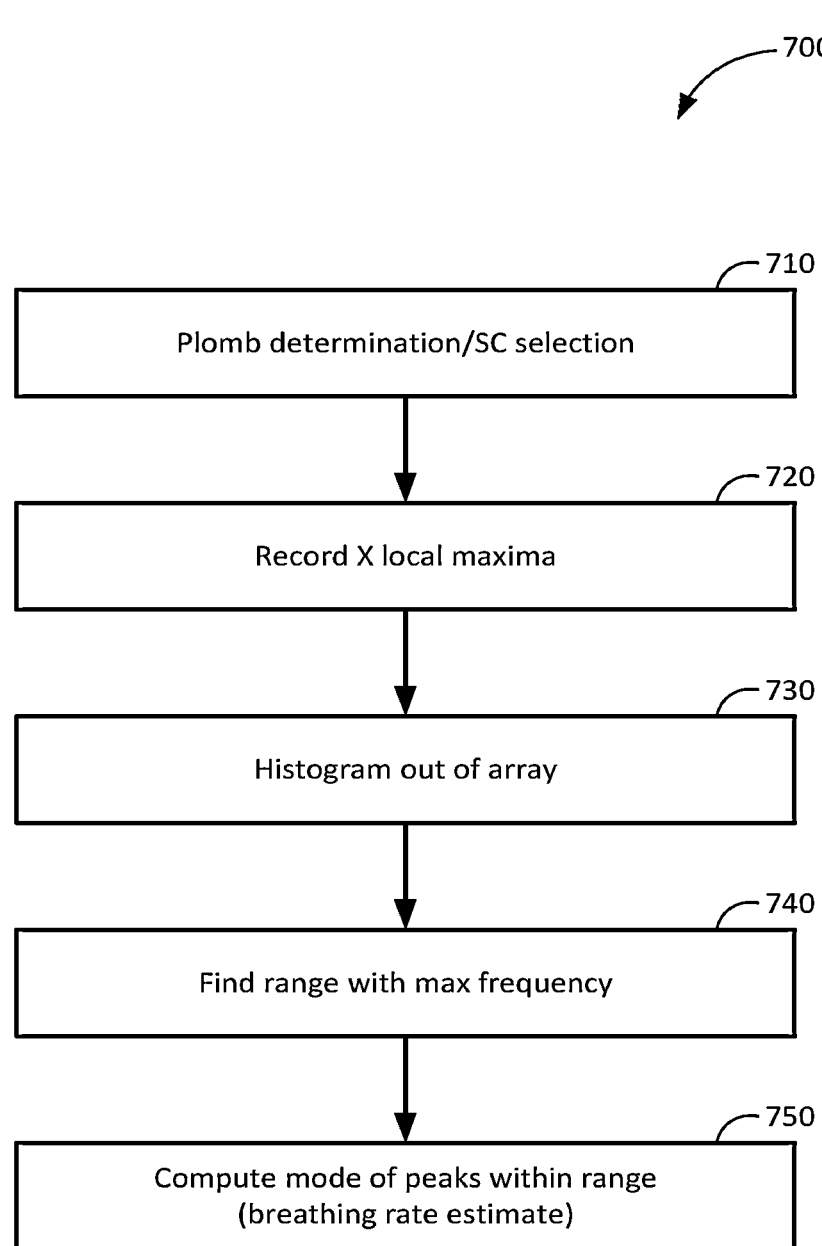
FIG. 7 is a flow diagram of a method of breathing rate determination using a plurality of subcarriers, according to embodiments, corresponding to algorithm 2 of FIG. 4.

FIG. 7 is a flow diagram of a method 700 of breathing rate determination using a plurality of subcarriers, according to embodiments, corresponding to algorithm 2 of FIG. 4. Similar to the method 500 of FIG. 5, the method 700 of FIG. 7 may be performed by software and/or hardware compo-nents of a receiving device (e.g., receiving device 230 of FIGS. 2A and 2B) having two antennas and processing incoming CSI from the two antennas in accordance with FIG. 4, for example. This method 700 may be performed in addition or as an alternative to the method 500 of FIG. 5. In particular, according to some embodiments, the method 700 may be performed if the method 500 is unsuccessful at determining a breathing rate.

Similar to the methods 500, the method 700 may begin with a plomb determination, as indicated at block 710. Here, however, the process may further involve subcarriers selec-tion based on a frequency analysis. In particular, a compari-son may be made with regard to the CSI for each subcarrier, to determine whether energy in a bpm range of interest is greater than the energy outside the range of interest. Examples of this are illustrated in FIGS. 8A and 8B.

Figure 8A:
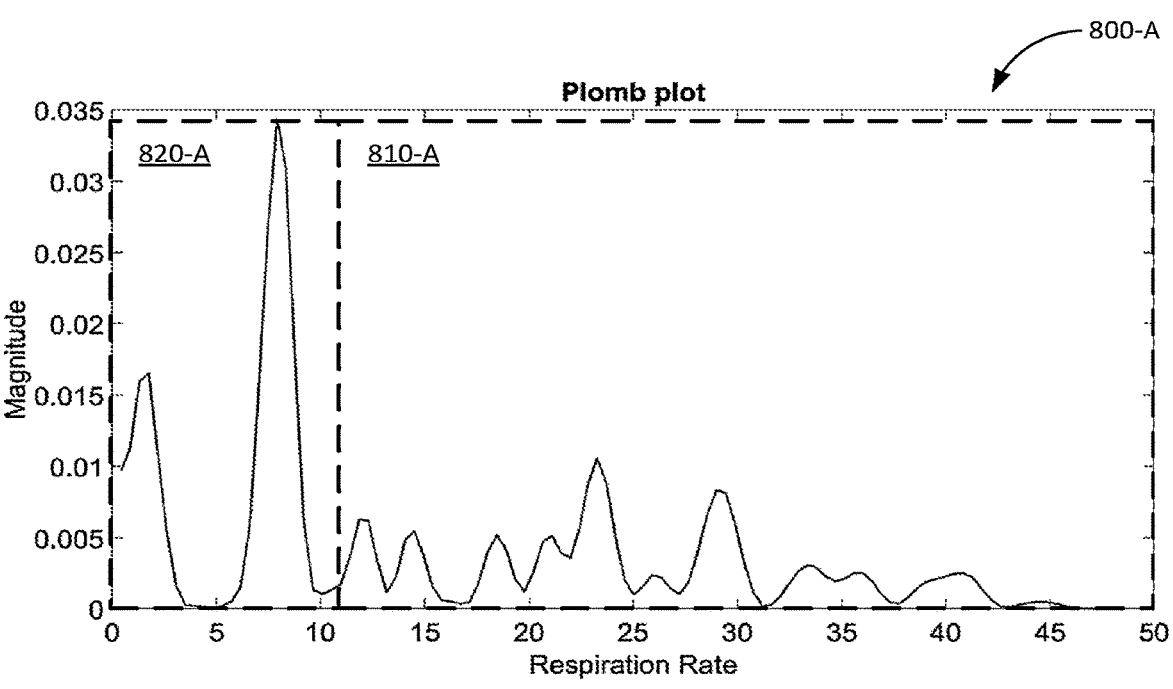
FIGS. 8A and 8B are graphs illustrating example plomb plots for the CSI of first and second subcarriers.

FIG. 8A is a first graph 800-A illustrating the plomb plot for the CSI of a first subcarrier. In accordance with algorithm 2 (multiple subcarrier breathing rate determination), subcar-riers can be selected based on whether energy within a range of interest exceeds energy outside the range of interest. In FIG. 8A, the range of interest 810-A has some local peak values, but the region 820-A outside the range of interest 810-A has more energy. Because the energy in the range of interest 810-A is exceeded by energy in the region 820-A, this first subcarrier is omitted from further processing to determine breathing rate. The omission of the CSI of such subcarriers can help reduce the likelihood of a false positive. In cases like graph 800-A having a peak value below the range of interest 810-A can cause leakage (e.g., due to harmonics) that causes false peak in the range of interest 800-A. And thus, omitting the CSI for subcarriers having this characteristic can be beneficial in trying to identify values from plomb plots resulting in actual movement.

Figure 8B:
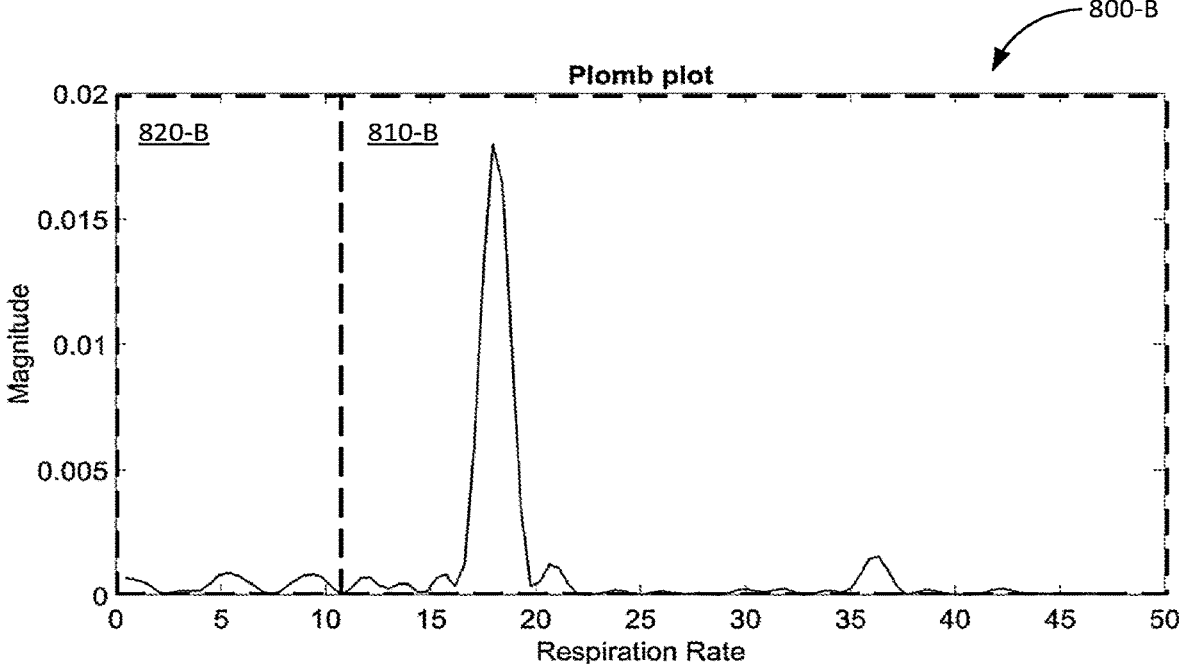

FIG. 8B is a second graph 800-A illustrating the plomb plot for the CSI of a second subcarrier. In contrast with FIG. 8A, the energy within the range of interest 810-B exceeds the energy in the region 820-B outside the range of interest 810-B. As such, this second subcarrier is used in further processing to determine breathing rate. (Again, although the range of interest in the examples of FIGS. 8A and 8B extend from approximately 10 bpm to 50 bpm, alternative embodi-ments may use different ranges for the range of interest.)

Figure 9A:
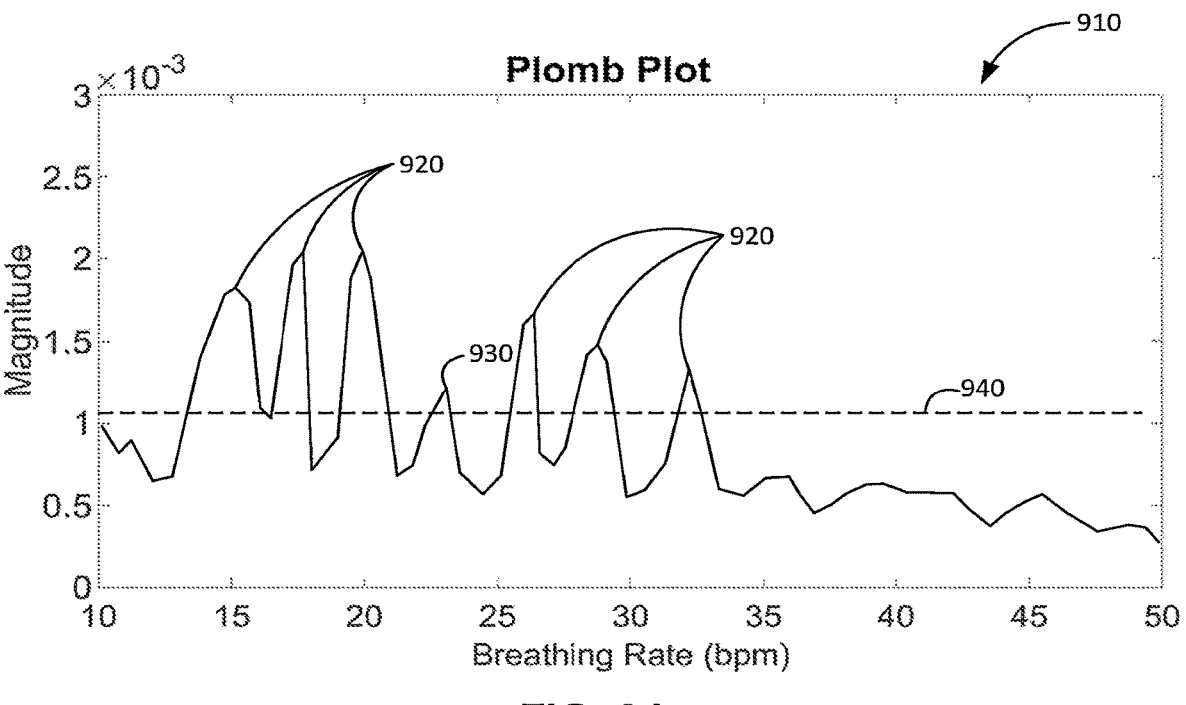
FIG. 9A is a graph of example plomb plot of a subcarrier having local maxima for which bpm values can be recorded, according to some embodiments.
Figure 9B:
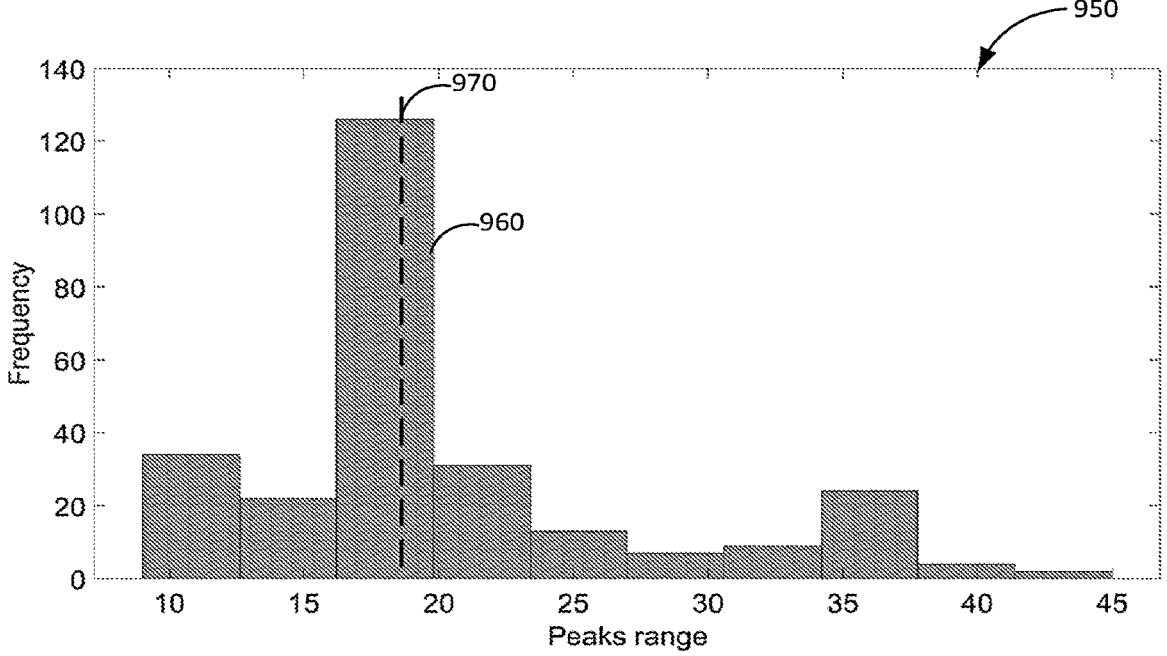
FIG. 9B is a graph of an example histogram that may be made, according to some embodiments.

Returning to FIG. 7, once subcarriers have been selected in block 710 (e.g., based on having more energy in a range of interest than outside the range of interest, as described above), the bpm values for a number of local maxima (also referred to herein as "peaks" or "peak values") within the range of interest for the CSI of each selected subcarrier can then be recorded in an array, as indicated at block 720. Once this bpm information for all subcarriers has been recorded, a histogram can then be made from the resulting array, as indicated at block 730. At block 740, the method 700 comprises finding the range in the histogram with the maximum frequency count, then, at block 750, the mode of the bpm values within the range is computed as the breathing estimate. FIGS. 9A and 9B, described hereafter, provide examples of these processes.

FIG. 9A is a graph 910 of example plomb plot of a subcarrier having local maxima for which bpm values can be recorded in accordance with the functionality of block 720 of FIG. 7. In this example, the subcarrier has seven local maxima (peaks) 920 and 930 exceeding a threshold magni-tude 940, where the threshold magnitude 940 comprises a minimum magnitude for recording into an array with which they histogram subsequently made. According to some embodiments, the bpm values of up to a threshold number of local maxima may be recorded. For example, in this embodiment, the threshold number may comprise 6, in which case local maximum 930 (which is the seventh largest in magnitude) would not be recorded. In cases where fewer than the threshold number of local maxima exceed the threshold magnitude 940, bpm values for all local maxima may be recorded. In the example of FIG. 9A, the approximate bpm values that would be recorded into the array, corresponding to the six largest local maxima 920, would be 15, 17, 20, 26, 29, and 33 bpm.

The value of the threshold magnitude 940 and/or threshold number of local maxima to record may be determined heuristically, based on desired functionality. As noted, be threshold number of local maxima to be recorded may comprise 6 in some embodiments, whereas the threshold may be different in other embodiments (4, 5, 7, 8, etc.). Additionally or alternatively, the threshold magnitude 940 may be a predetermined/static value or may be a dynamic value based on peak values in the plomb plot. In some embodiments, for example, the threshold magnitude 940 may be set at 50% of the value of the largest local maximum in the plomb plot. Again, alternative embodiments may set the threshold at different values (e.g., 40%, 45%, 55%, 60%, etc.).

FIG. 9B is a graph 950 of a histogram that may be made in accordance with block 730 of FIG. 7. That is, the histogram is made from the bpm values of local maxima (peaks) for all selected subcarriers, which may be recorded in an array, as noted previously. Here, the histogram plots a frequency (e.g., number of occurrences) of recorded bpm values for various ranges within the range of interest. Similar to other values for thresholds of ranges described herein, the values for ranges in the histogram of graph 950 (e.g., the min and max bpm values of each peaks range plotted in the histogram) may be determined heuristically, balancing considerations such as the desire for accuracy and the desire to exclude noise/false positives.

As indicated in the functionality of blocks 740 and 750 of FIG. 7, the determination of a breathing rate based on identifying the range having highest frequency, then calculating the mode of values in the identified range (e.g., the bpm, within the identified range, corresponding with the most peaks). In this example, range 960 (spanning from 16-20 bpm) has the highest frequency of bpm values. A calculation of the mode of bpm values for the range 960 results in a mode 970 of approximately 18 bpm. This, then, can be used as the determined breathing rate.

Again, threshold may be used to filter out potential false positives. If, for example, a frequency of a range in the histogram fails to meet a threshold minimum frequency, a number of subcarriers in which energy within the range of interest exceeds the energy outside the rate of interest is lower than a threshold number, the local maxima in the plomb plot or all subcarriers fail to meet a minimum magnitude, or any combination of these conditions are met, this may result in a determination that a breathing rate cannot be determined. In such instances, some embodiments may attempt to determine breathing rate using an algorithm 3, in which all subcarriers are used to determine the breathing rate.

Figure 10:
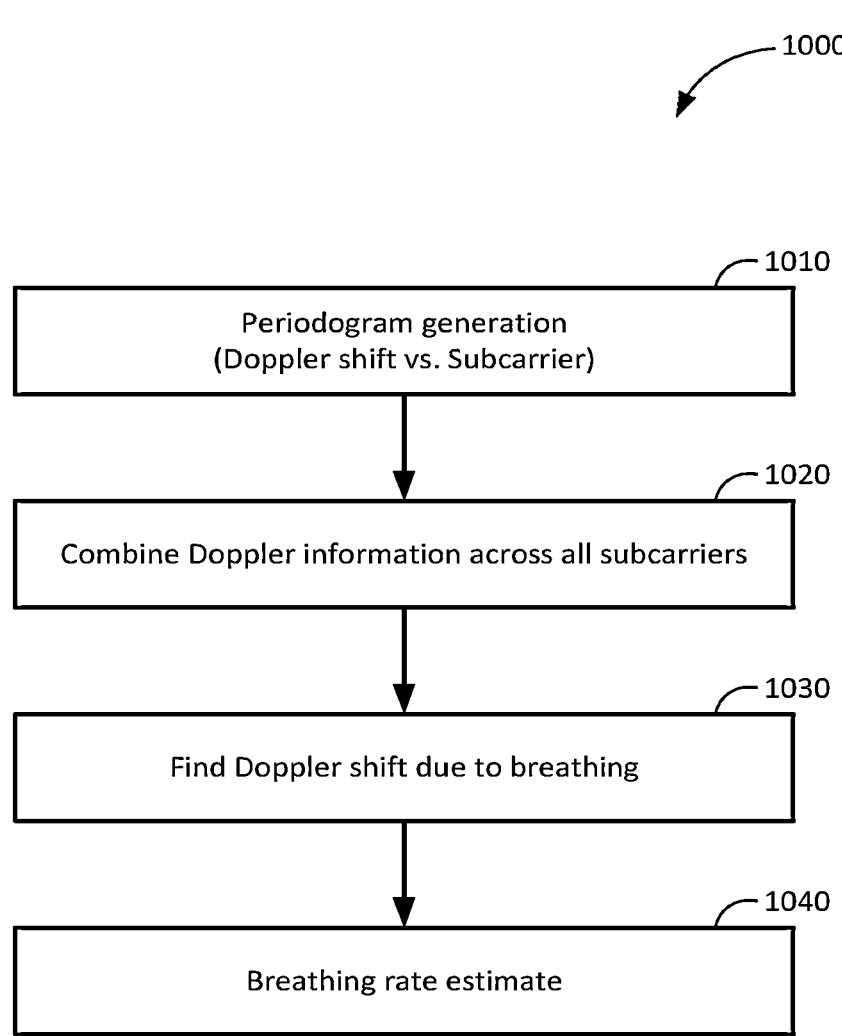
FIG. 10 is a flow diagram of a method of determining a breathing rate estimate, according to embodiments, corresponding to algorithm 3 of FIG. 4.

FIG. 10 is a flow diagram of a method 1000 of determining a breathing rate estimate. Similar to the methods 500 of FIG. 5 and 700 of FIG. 7, the method 1000 of FIG. 10 may be performed by software and/or hardware components of a receiving device (e.g., receiving device 230 of FIGS. 2A and 2B) having two antennas and processing incoming CSI from the two antennas in accordance with FIG. 4, for example. This method 1000 may be performed in addition or as an alternative to the methods 500 and 700. In particular, according to some embodiments, the method 1000 may be performed if the method 700 is unsuccessful at determining a breathing rate.

The functionality of block 1010 comprises periodogram generation in which Doppler shift may be determined for all subcarriers over a range of interest. At block 1020, this Doppler information may be combined across all subcarriers into a single set of data (e.g., a 2D plot). The Doppler shift due to breathing can then be found, as indicated at block 1030, by identifying a peak value in the combined Doppler information. The bpm corresponding to this Doppler shift can then be used as breathing rate estimate, as indicated at block 1040. An example of this is illustrated in FIGS. 11A and 111B.

Figure 11A:
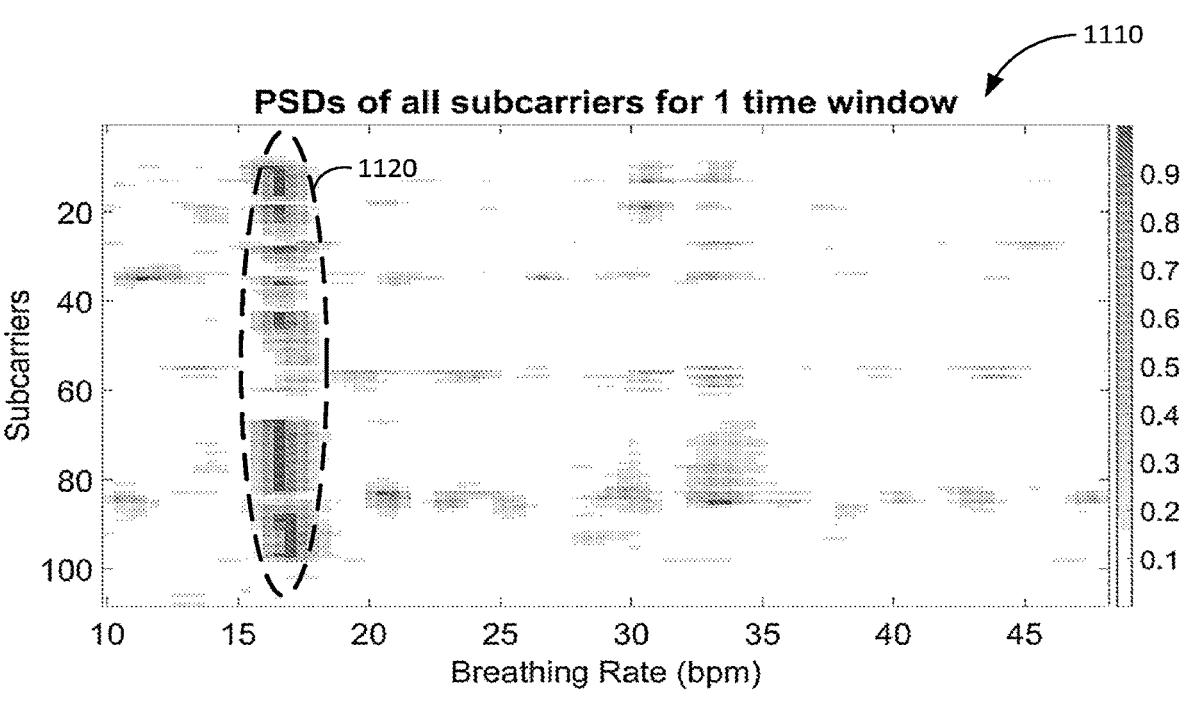
FIG. 11A is an example graph of a periodogram in which power spectral density (PSD) is plotted for all subcarriers of an example transmission.

FIG. 11A is an example graph 1110 of a periodogram in which power spectral density (PSD, e.g., using plomb) reflective of Doppler shift across a range of interest for bpm is plotted for all 128 subcarriers of an example transmission. Here, Doppler information (e.g., generated at block 1010 of FIG. 10) is represented as intensity, where darker shades represent stronger intensity. As can be seen, the CSI of most subcarriers in this example show movement at approximately 17 bpm (identified with ellipse 1120). In practice, according to some embodiments, this information may be stored in a 2D matrix for processing.

Figure 11B:
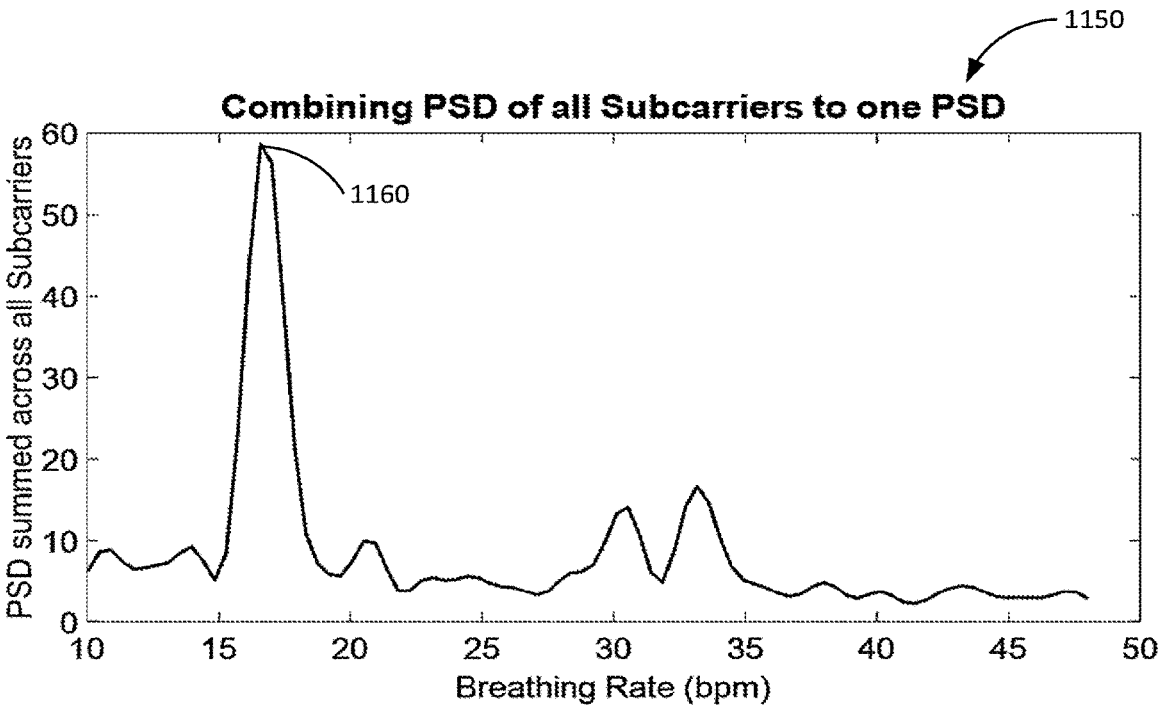
FIG. 11B is a graph representing the sum of PSD across all subcarriers of the graph in FIG. 11A.

FIG. 11B is a graph 1150 representing combined PSD across all subcarriers, which may correspond to the combined Doppler information generated at block 1020 of FIG. 10. The information in graph 1150 of FIG. 11B corresponds with the information graph 1110 of FIG. 11A, comprising a summation of intensities in the graph 1110, across all subcarriers. As can be seen, a summation of the intensity values in the ellipse 1120 results a peak 1160 in the PSD in the range of interest. As a person of ordinary skill in the art will appreciate, the PSD across all subcarriers can be determined as:

$$y(k) = \sum\nolimits_{n=1}^{N} psd(n, k), \qquad \text{(Eqn. 5)}$$

where psd(n, k) is the PSD normalized within [0, 1] for the "nth" subcarrier and the "kth" frequency shift).

Figure 12A:
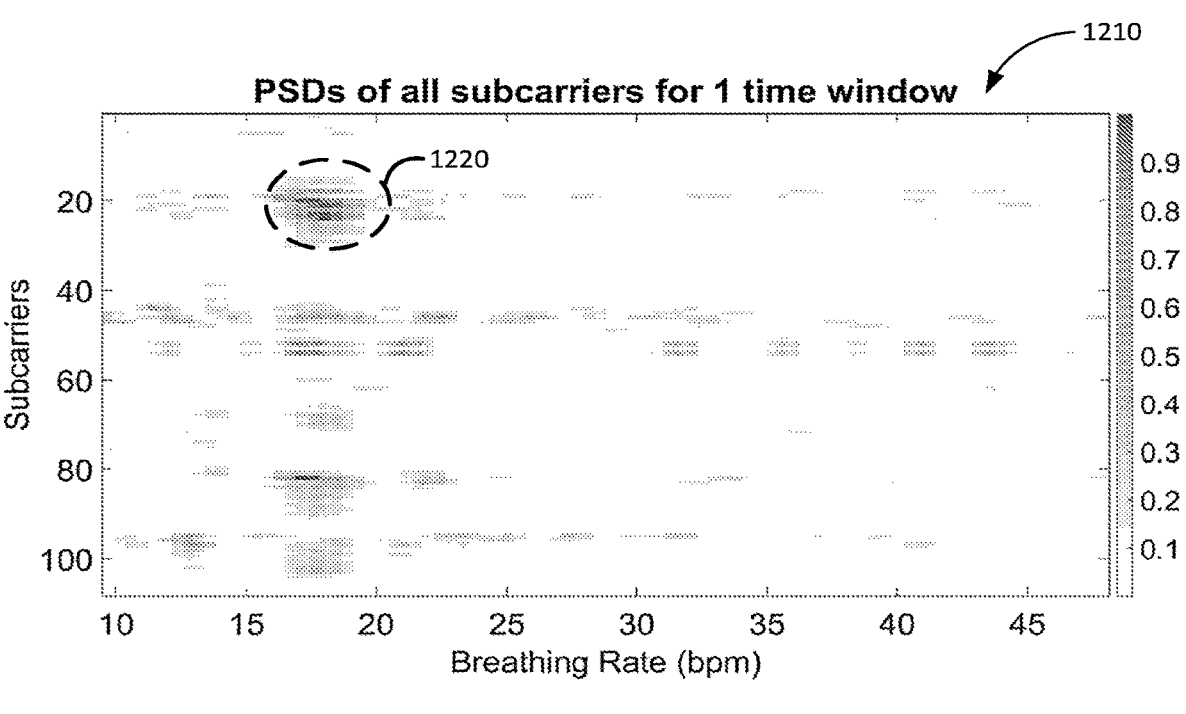
FIG. 12A is another example graph of a periodogram in which PSD is plotted for all subcarriers of another example transmission.
Figure 12B:
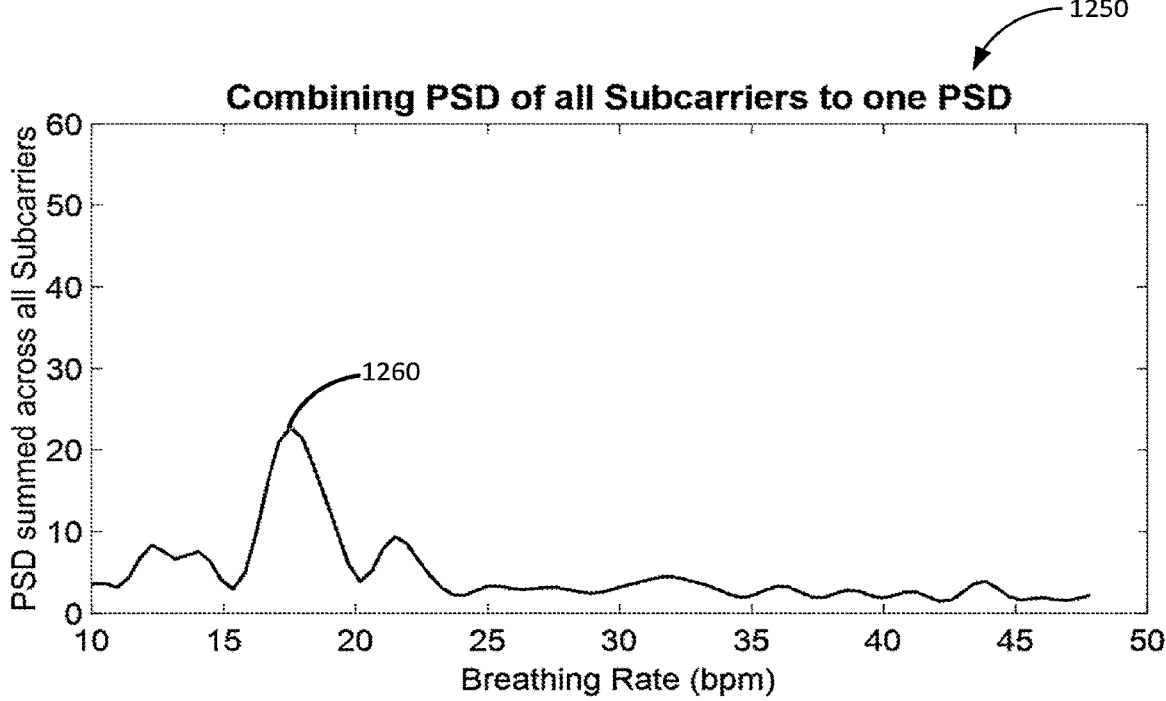
FIG. 12B is a graph representing the sum of PSD across all subcarriers of the graph in FIG. 12A.

FIGS. 12A and 12B are graphs illustrating how a breathing rate may be determined the using all subcarriers (e.g., algorithm 3 of FIG. 4) even when only a small portion of subcarriers detect the breathing. FIG. 12A, for example, is a graph 1210 of a periodogram similar to the graph 1110 of FIG. 11A. In contrast with graph 1110, however, the graph 1210 illustrates, only a few subcarriers detect breathing, illustrated in ellipse 1220. FIG. 12B is a graph 1250 representing a combined PSD summed across all subcarriers. As can be seen, although only a few subcarriers detect breathing in ellipse 1220, and results in a single dominant peak value 1260 at 17.5462 bpm. This bpm can be used as he detected breathing rate (e.g., corresponding with the functionality at block 1040 of FIG. 10).

Figure 13A:
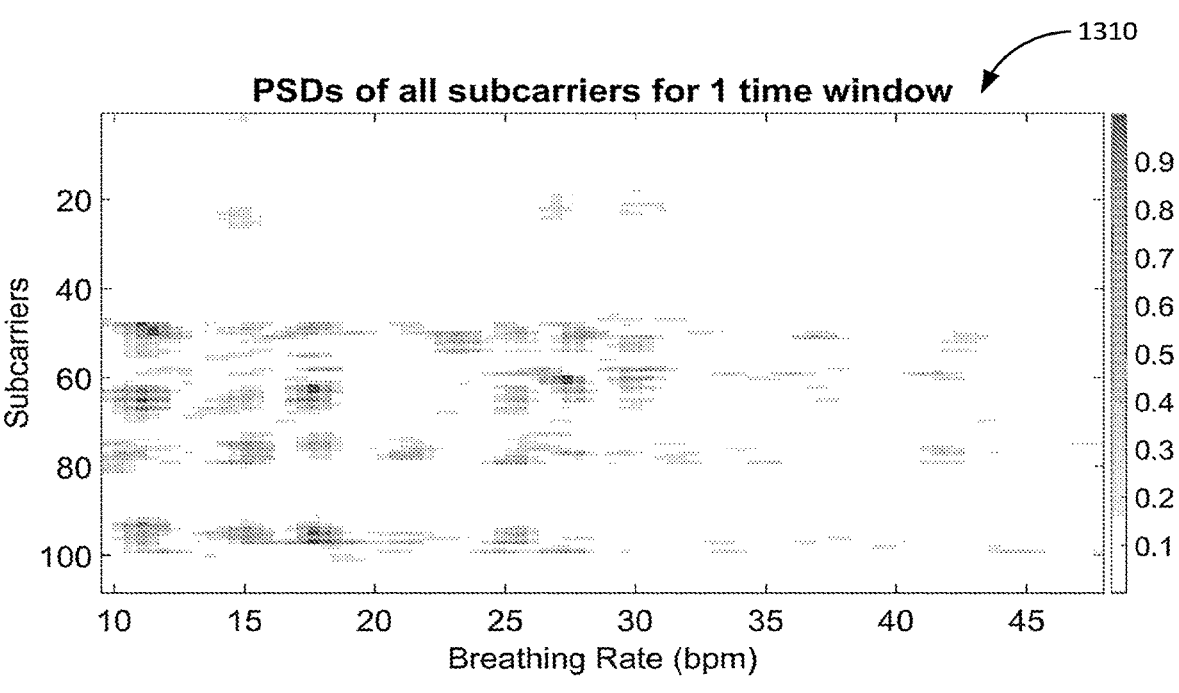
FIG. 13A is yet another example graph of a periodogram in which PSD is plotted for all subcarriers of yet another example transmission.
Figure 13B:
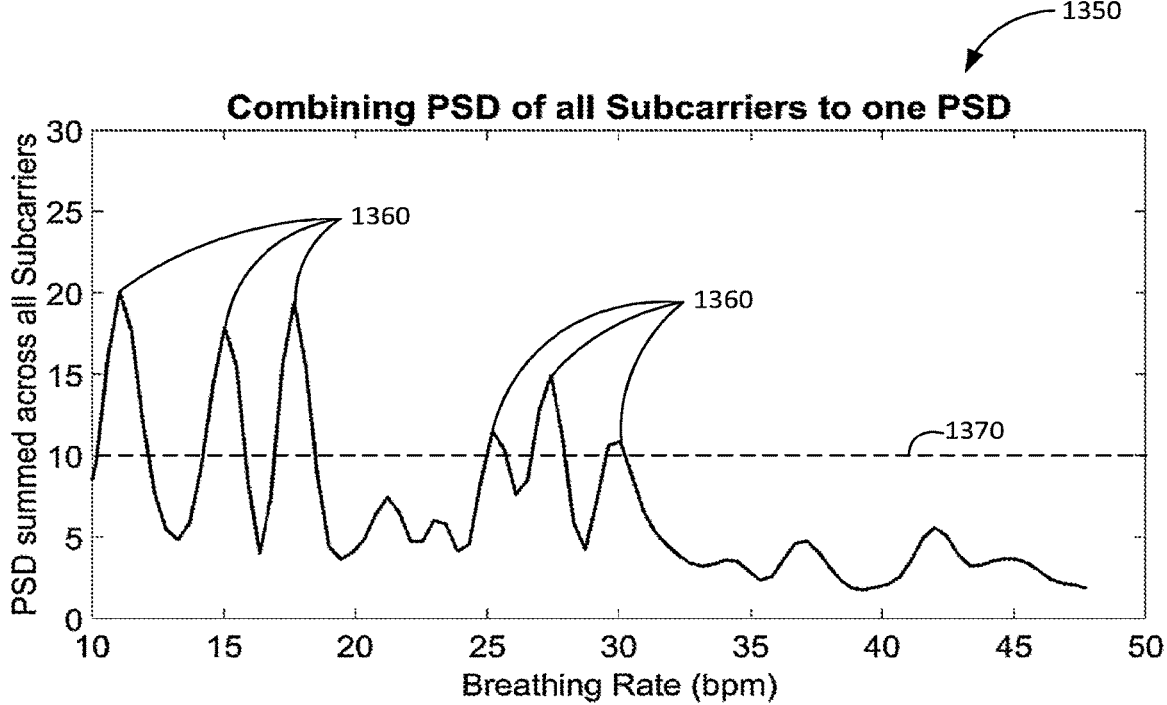
FIG. 13B is a graph representing the sum of PSD across all subcarriers of the graph in FIG. 13A.

It can be noted that some embodiments may employ additional techniques to identify a breathing rate in cases where there are multiple peaks in the combined PSD summed across all subcarriers. FIGS. 13A and 13B illustrate an example.

FIG. 13A is a graph 1310 of a periodogram similar to graphs 1110 of FIG. 11A and 1210 of FIG. 12A. In this example, however, there is no single bpm at which most Doppler shift is detected. Instead, Doppler shift is spread across many different bpms. This may be the case, for example, in environments in which there are objects, such as a ceiling fan, making periodic motions at a rate within the region of interest for human breathing. As illustrated in FIG. 13B, the corresponding graph 1350, representing the combined PSD of the values in graph 1310 of FIG. 13A summed across all subcarriers, has multiple peaks 1360. Some embodiments may further use a threshold value 1370, representing a minimum peak value for combined PSD across all subcarriers. This can help filter out false positives. (According to some embodiments, this value may be predetermined, or may be a dynamic value (e.g., 50% of the maximum PSD peak value), similar to the thresholds previously discussed.) However, as illustrated in the example of FIG. 13B, there still may be many peaks 1360 above the threshold value 1370.

According to some embodiments, a breathing rate may be determined from a combined PSD having multiple peaks (e.g., peaks 1360) above a threshold value (e.g., social value 1370) by leveraging historical information. As previously indicated, some embodiments may determine a breathing rate at some frequency (e.g., every second). As such, embodiments may keep a log of recent breathing rate determinations. Thus, according to some embodiments, if the number of local maxima (peaks) in combined PSD values for all subcarriers is greater than 1, the breathing rate may be selected as the local maximum being the closest to the average or mean of the last X breathing rate determinations.

The value of X may be determined heuristically, as with other bones described herein. According to some embodiments, the value of X may be 5. In alternative embodiments, the value of X may be different (e.g., 2, 3, 4, 6, 7, 8, etc.). According to some embodiments, the value of X may depend on the rate at which breathing rates are determined. For example, if a breathing rate is determined every second, value of X may be set at 5, because a human breathing rate typically does not change abruptly over a period of 5 seconds.

FIG. 14 is a flowchart illustrating a method 1400 of radio frequency (RF) sensing for breathing rate determination, according to an embodiment. As with other figures provided herein, FIG. 14 is provided as a non-limiting example. Alternative embodiments may add, omit, rearrange, and/or otherwise alter the operations illustrated in FIG. 14. In some aspects, the method 1400 of breathing rate determination may reflect an implementation of the embodiments described above. Further, although the embodiments described above are with respect to the detection of a breathing rate for human, embodiments are not so limited. The method 1400, for example, may determine a breathing rate for a nonhuman (e.g., a pet or other animal). One or more operations of the blocks illustrated in FIG. 14 may be performed by a computer system such as a wireless device (e.g., a receiving device as described in the embodiments above) and/or a computer or other electronic device communicatively connected therewith (e.g., a server, personal computer, or other device). Components of an example computing system are illustrated in FIG. 15 and described hereafter.

The functionality at block 1410 comprises obtaining CSI corresponding to each subcarrier of a plurality of subcarriers in a set of RF transmissions comprising at least the plurality of subcarriers. According to some embodiments, the set of RF transmissions may comprise Wi-Fi transmissions. Specifics regarding this functionality may depend on the above device performing functionality of block 1410. For example, a receiving device may obtain the CSI by performing measurements (e.g., time of arrival (TOA) measurements) of RF transmissions by a transmitting device. In some embodiments, a monostatic configuration may be utilized, in which case obtaining the CSI may comprise both transmitting and receiving RF signals. In some embodiments, a separate device (e.g., a server) may obtain the CSI and make the breathing rate determination. With respect to the plurality of subcarriers, this may correspond to all subcarriers in the RF transmission (e.g., 128 subcarriers of a Wi-Fi transmission), or a subset thereof.

Figure 15:
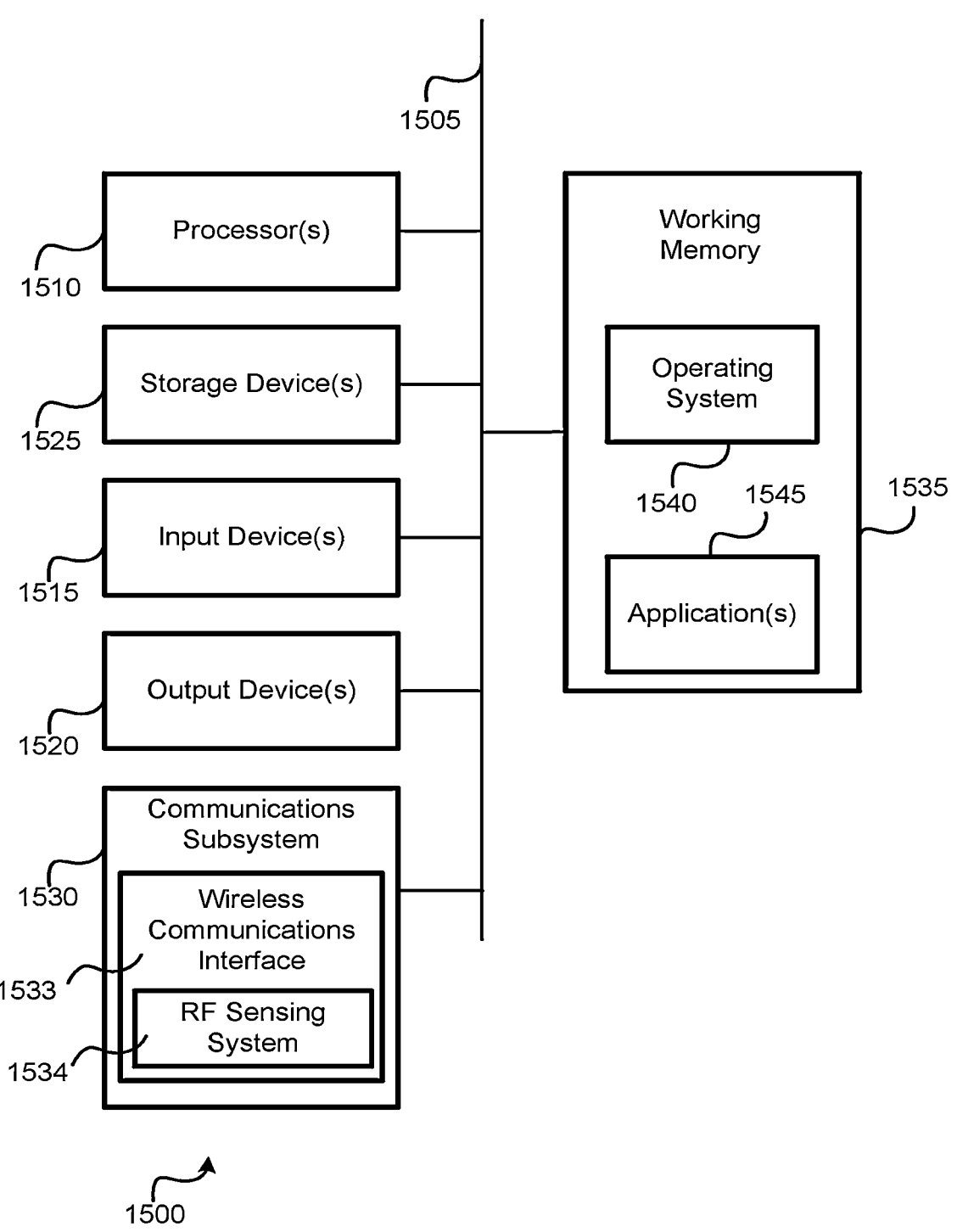
FIG. 15 is a block diagram of an embodiment of a computing system.

Means for performing the functionality of block 1410 may comprise one or more processors 1510, bus 1505, working memory 1535 (which may include operating system 1540 and/or one or more applications 1545) communications subsystem 1530 (which may include wireless communications interface 1533 and/or RF sensing system 1534), and/or other components of a computer system as illustrated in FIG. 15 and described hereinafter.

The functionality at block 1420 comprises extracting phase information of the CSI corresponding to each subcarrier of the plurality of subcarriers over a period of time. As illustrated in FIGS. 3A and 4, obtaining the CSI may comprise receiving the CSI at a first antenna and a second antenna, and extracting phase information of the CSI may comprise multiplying the CSI received at the first antenna with the conjugate of the CSI received at the second antenna to get a result, and unwrapping phase information from the result. Additionally or alternatively, the period of time may vary, depending on desired functionality. In some embodiments, the period of time may be 30 seconds. In alternative embodiments, the period of time may be longer or shorter than this (e.g., 10 seconds, 20 seconds, 40 seconds, 50 seconds, one minute, etc.).

Means for performing the functionality of block 1420 may comprise one or more processors 1510, bus 1505, working memory 1535 (which may include operating system 1540 and/or one or more applications 1545) communications subsystem 1530 (which may include wireless communications interface 1533 and/or RF sensing system 1534), and/or other components of a computer system as illustrated in FIG. 15 and described hereinafter.

The functionality at block 1430 comprises determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies. As indicated in the embodiments above, determining the frequency spectrum may comprise determining a plomb plot (or data equivalent), indicating Doppler shift for various rates of phase change Means for performing the functionality of block 1430 may comprise one or more processors 1510, bus 1505, working memory 1535 (which may include operating system 1540 and/or one or more applications 1545) communications subsystem 1530 (which may include wireless communications interface 1533 and/or RF sensing system 1534), and/or other components of a computer system as illustrated in FIG. 15 and described hereinafter.

The functionality at block 1440 comprises determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates. As noted herein, the predetermined range of frequencies for breathing rates may correspond with a range of breathing rates for human breathing. Embodiments described herein use the predetermined range of 10-50 bpm, but alternative embodiments may use different ranges (e.g., having a lower limit of 7, 8, 9, 11, or 12 bpm, etc., and having an upper limit of 40, 45, 55, or 60 bpm, etc.).

Means for performing the functionality of block 1440 may comprise one or more processors 1510, bus 1505, working memory 1535 (which may include operating system 1540 and/or one or more applications 1545) communications subsystem 1530 (which may include wireless communications interface 1533 and/or RF sensing system 1534), and/or other components of a computer system as illustrated in FIG. 15 and described hereinafter.

As noted in the embodiments above, different algorithms may be used to determine a breathing rate based on different subcarriers. For example, according to some embodiments, the subcarrier set may comprise a single subcarrier, and wherein the method further comprises selecting the single subcarrier from the plurality of subcarriers, based on a BNR of the single subcarrier, wherein the BNR for each subcarrier of the plurality of subcarriers comprises a ratio of energy within the predetermined range to total energy, with respect to the frequency spectrum of the CSI corresponding to the respective subcarrier. In such embodiments, selecting the single subcarrier may be based on a determination that the single subcarrier has the highest BNR of all subcarriers in the plurality of subcarriers.

According to some embodiments, the subcarrier set may comprise a subset of two or more subcarriers of the plurality of subcarriers. As described herein (e.g., with respect to FIGS. 8A and 8B), in such embodiments, the method may further comprise selecting the subset at least in part by determining that, for each subcarrier of the subset, there is more energy within the predetermined range than outside the predetermined range in the frequency spectrum of the CSI corresponding to the respective subcarrier. As noted, in such embodiments, determining the breathing rate may comprise determining a histogram from local maximum phase change values in the predetermined range of the frequency spectrum of the CSI corresponding to the subcarriers in the subset, identifying a range within the histogram having a largest number of local maximum phase change values, and determining the breathing rate as a mode of local maximum phase change values within the identified range. As noted elsewhere herein, embodiments may record a maximum number of local maxima (peaks) in the phase change values to be used for creating the histogram. As such, according to some embodiments, determining a histogram from local maximum phase change values may comprise, for each subcarrier in the subset, using up to a predetermined number of local maximum phase change values in the predetermined range of the frequency spectrum of the CSI corresponding to the respective subcarrier. As further noted, a minimum threshold may be used to filter out potential false positives. As such, according to some embodiments, for each subcarrier in the subset, the local maximum phase change values in the predetermined range of the frequency spectrum of the CSI corresponding to the respective subcarrier exceed a minimum threshold value.

According to some embodiments, the subcarrier set may comprise all subcarriers of the plurality of subcarriers. As noted above, in such embodiments, determining the frequency spectrum for each subcarrier of the plurality of subcarriers may comprise determining a PSD for each subcarrier of the plurality of subcarriers, and determining the breathing rate from the frequency spectrum may comprise determining the breathing rate to correspond to a frequency of a local maximum value, within the predetermined range, of a sum of the PSDs for all subcarriers of the plurality of subcarriers. In such embodiments, determining the breathing rate to correspond to the frequency of the local maximum value may comprise identifying the local maximum value, from a plurality of local maximum values, as corresponding to one or more previously determined breathing rates.

The functionality at block 1450 comprises outputting an indication of the determined breathing rate. Depending on desired functionality, the way in which the indication of the determined breathing is output may vary. For example, according to some embodiments, outputting the indication may comprise providing the indication from one software layer to another software layer of an electronic device. Additionally or alternatively, outputting the indication of the determined breathing rate may comprise providing the indication from one software function or application to another. According to some embodiments, outputting the indication of the determined breathing rate may comprise sending the indication from one device to another device. Additionally or alternatively, outputting the indication of the determined breathing rate may comprise providing the indication via a user interface (e.g., display, speaker, etc.).

Means for performing the functionality of block 1450 may comprise one or more processors 1510, bus 1505, working memory 1535 (which may include operating system 1540 and/or one or more applications 1545) communications subsystem 1530 (which may include wireless communications interface 1533 and/or RF sensing system 1534), one or more output devices 1520, and/or other components of a computer system as illustrated in FIG. 15 and described hereinafter.

FIG. 15 is a block diagram of an embodiment of a computing system 1500. As noted, the computer system 1500 may be capable of performing the functionality of the one or more of the operations illustrated in FIG. 14, and may comprise a receiving device (e.g., that receives RF signals used for RF sensing), and/or a device communicatively coupled thereto. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be located at different physical locations.

The computing system 1500 is shown comprising hardware elements that can be electrically coupled via a bus 1505 (or may otherwise be in communication, as appropriate). The hardware elements may include processor(s) 1510, which can include without limitation one or more general-purpose processors, one or more special-purpose processors (such as a DSP, graphics processing unit (GPU), application-specific integrated circuit (ASIC), field-programmable gate array (FPGA), and/or the like), and/or other processing structure or processing unit, which can be configured to perform one or more of the methods described herein, including the method described in relation to FIG. 14 and/or the processes described in relation to FIGS. 1-14. The computing system 1500 also can include one or more input devices 1515, which can include without limitation a mouse, a keyboard, a camera, a microphone, a touchscreen, sensor, etc., or any combination thereof, and one or more output devices 1520, which can include without limitation a display device, a speaker, etc., or any combination thereof.

The computing system 1500 may further include (and/or be in communication with) one or more non-transitory storage devices 1525, which can comprise, without limitation, local and/or network accessible storage, and/or can include, without limitation, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including without limitation, various file systems, database structures, and/or the like.

The computing system 1500 may also include a communications subsystem 1530, which can include support of wireline communication technologies and/or wireless communication technologies (in some embodiments) managed and controlled by a wireless communication interface 1533. The communications subsystem 1530 may include a modem, a network card (wireless or wired), an infrared communication device, a wireless communication device, and/or a chipset, and/or the like. The communications subsystem 1530 may include one or more input and/or output communication interfaces, such as the wireless communication interface 1533, to permit data and signaling to be exchanged with a network, mobile devices, other computer systems, and/or any other electronic devices described herein. An RF sensing system 1534 may comprise specialized circuitry and/or other hardware and/or software components capable of performing RF sensing as described herein. According to some embodiments, the RF sensing system 1534 may be incorporated into a wireless communications interface 1533 (as illustrated in FIG. 15) such that one or more Tx antennas and one or more Rx antennas of the wireless communications interface 1533 may be used for both RF sensing and data communication. For example, in some embodiments, the wireless communication interface 1533 may comprise an 802.11ad-compatible and/or 802.11ay-compatible modem capable of both RF sensing and data communication. More broadly, the wireless communications interface 1533 may comprise one or more transceivers having one or more wireless radios capable of transmitting and receiving RF signals using a WLAN standard (e.g., IEEE 802.11/Wi-Fi), and may be used for WLAN communication, in addition to RF sensing. RF signals may comprise communication packets utilized by the WLAN standard. As previously noted, embodiments herein may leverage existing techniques for channel estimation to obtain CSI to use for RF sensing. Additionally or alternatively, the wireless communications interface 1533 and/or RF sensing system 1534 may comprise multiple antennas (e.g., an antenna array) capable of beamforming, to enable Tx and/or Rx beamforming as described herein.

As noted, some embodiments may have an RF sensing system 1534 that is not used for wireless communication. In such instances, the RF sensing system 1534 may be incorporated elsewhere within the computing system 1500. In some embodiments, for example, the RF sensing system 1534 may be incorporated into the computing system 1500 as an input device 1515. Other sensors, too, may be included as input devices 1515.

In many embodiments, the computing system 1500 will further comprise a working memory 1535, which can include a RAM and/or or ROM device. Software elements, shown as being located within the working memory 1535, can include an operating system 1540, device drivers, executable libraries, and/or other code, such as application(s) 1545, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 14, may be implemented as code and/or instructions that are stored (e.g. temporarily) in working memory 1535 and are executable by a computer (and/or a processor within a computer such as processor(s) 1510); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computing system 1500. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computing system 1500 and/or might take the form of source and/or installable code, which, upon compilation and/or installation on the computing system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments.

Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of radio frequency (RF) sensing for breathing rate determination, the method comprising: obtaining channel state information (CSI) corresponding to each subcarrier of a plurality of subcarriers in a set of RF transmissions comprising at least the plurality of subcarriers; extracting phase information of the CSI corresponding to each subcarrier of the plurality of subcarriers over a period of time; determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies; determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and outputting an indication of the determined breathing rate.

Clause 2. The method of clause 1, wherein: obtaining the CSI comprises receiving the CSI at a first antenna and a second antenna, and extracting phase information of the CSI comprises determining a phase difference between the CSI received at the first antenna and the CSI received at the second antenna.

Clause 3. The method of any one of clauses 1-2 wherein the subcarrier set comprises a single subcarrier, and wherein the method further comprises selecting the single subcarrier from the plurality of subcarriers, based on a Breathing to Noise Ratio (BNR) of the single subcarrier, wherein the BNR for each subcarrier of the plurality of subcarriers comprises a ratio of energy within the predetermined range to total energy, with respect to the frequency spectrum of the CSI corresponding to the respective subcarrier.

Clause 4. The method of clause 3 wherein selecting the single subcarrier is based on a determination that the single subcarrier has the highest BNR of all subcarriers in the plurality of subcarriers.

Clause 5. The method of any one of clauses 1-2 wherein the subcarrier set comprises a subset of two or more subcarriers of the plurality of subcarriers, and wherein the method further comprises selecting the subset at least in part by determining that, for each subcarrier of the subset, there is more energy within the predetermined range than outside the predetermined range in the frequency spectrum of the CSI corresponding to the respective subcarrier.

Clause 6. The method of clause 5 wherein determining the breathing rate comprises: determining a histogram from local maximum phase change values in the predetermined range of the frequency spectrum of the CSI corresponding to the subcarriers in the subset; identifying a range within the histogram having a largest number of local maximum phase change values; and determining the breathing rate as a mode of local maximum phase change values within the identified range.

Clause 7. The method of clause 6 wherein determining a histogram from local maximum phase change values comprises, for each subcarrier in the subset, using up to a predetermined number of local maximum phase change values in the predetermined range of the frequency spectrum of the CSI corresponding to the respective subcarrier.

Clause 8. The method of any one of clauses 6-7 wherein, for each subcarrier in the subset, the local maximum phase change values in the predetermined range of the frequency spectrum of the CSI corresponding to the respective subcarrier exceed a minimum threshold value.

Clause 9. The method of any one of clauses 1-2 wherein the subcarrier set comprises all subcarriers of the plurality of subcarriers, and wherein: determining the frequency spectrum for each subcarrier of the plurality of subcarriers comprises determining a power spectral density (PSD) for each subcarrier of the plurality of subcarriers; and determining the breathing rate from the frequency spectrum comprises determining the breathing rate to correspond to a frequency of a local maximum value, within the predetermined range, of a sum of the PSDs for all subcarriers of the plurality of subcarriers.

Clause 10. The method of clause 9 wherein determining the breathing rate to correspond to the frequency of the local maximum value comprises identifying the local maximum value, from a plurality of local maximum values, as corresponding to one or more previously determined breathing rates.

Clause 11. The method of any one of clauses 1-10 wherein the set of RF transmissions comprise Wi-Fi transmissions.

Clause 12. A device comprising: a memory; and one or more processors communicatively coupled with the memory, wherein the one or more processors are configured to: obtain channel state information (CSI) corresponding to each subcarrier of a plurality of subcarriers in a set of RF transmissions comprising at least the plurality of subcarriers; extract phase information of the CSI corresponding to each subcarrier of the plurality of subcarriers over a period of time; determine, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies; determine a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and output an indication of the determined breathing rate.

Clause 13. The device of clause 12, wherein: to obtain the CSI, the one or more processors are configured to obtain CSI received at a first antenna and a second antenna, and to extract phase information of the CSI, the one or more processors are configured to determine a phase difference between the CSI received at the first antenna and the CSI received at the second antenna.

Clause 14. The device of any one of clauses 12-13 wherein the subcarrier set comprises a single subcarrier, and wherein the one or more processors are configured to select the single subcarrier from the plurality of subcarriers based on a Breathing to Noise Ratio (BNR) of the single subcarrier, wherein the BNR for each subcarrier of the plurality of subcarriers comprises a ratio of energy within the predetermined range to total energy, with respect to the frequency spectrum of the CSI corresponding to the respective subcarrier.

Clause 15. The device of clause 14 wherein the one or more processors are configured to select the single subcarrier based on a determination that the single subcarrier has the highest BNR of all subcarriers in the plurality of subcarriers.

Clause 16. The device of any one of clauses 12-13 wherein the subcarrier set comprises a subset of two or more subcarriers of the plurality of subcarriers, and wherein the one or more processors are configured to select the subset at least in part by determining that, for each subcarrier of the subset, there is more energy within the predetermined range than outside the predetermined range in the frequency spectrum of the CSI corresponding to the respective subcarrier.

Clause 17. The device of clause 16 wherein, to determine the breathing rate, the one or more processors are configured to determine a histogram from local maximum phase change values in the predetermined range of the frequency spectrum of the CSI corresponding to the subcarriers in the subset; identify a range within the histogram having a largest number of local maximum phase change values; and determine the breathing rate as a mode of local maximum phase change values within the identified range.

Clause 18. The device clause 17 wherein, to determine a histogram from local maximum phase change values, the one or more processors are configured to, for each subcarrier in the subset, use up to a predetermined number of local maximum phase change values in the predetermined range of the frequency spectrum of the CSI corresponding to the respective subcarrier.

Clause 19. The device of any one of clauses 17-18 wherein, for each subcarrier in the subset, the local maximum phase change values in the predetermined range of the frequency spectrum of the CSI corresponding to the respective subcarrier exceed a minimum threshold value.

Clause 20. The device of any one of clauses 12-13 wherein the subcarrier set comprises all subcarriers of the plurality of subcarriers, and wherein: to determine the frequency spectrum for each subcarrier of the plurality of subcarriers, the one or more processors are configured to determine a power spectral density (PSD) for each subcarrier of the plurality of subcarriers; and to determine the breathing rate from the frequency spectrum, the one or more processors are configured to determine the breathing rate to correspond to a frequency of a local maximum value, within the predetermined range, of a sum of the PSDs for all subcarriers of the plurality of subcarriers.

Clause 21. The device of clause 20 wherein, to determine the breathing rate to correspond to the frequency of the local maximum value, the one or more processors are configured to identify the local maximum value, from a plurality of local maximum values, as corresponding to one or more previously determined breathing rates.

Clause 22. An apparatus for radio frequency (RF) sensing for breathing rate determination, the apparatus comprising: means for obtaining channel state information (CSI) corresponding to each subcarrier of a plurality of subcarriers in a set of RF transmissions comprising at least the plurality of subcarriers; extracting phase information of the CSI corresponding to each subcarrier of the plurality of subcarriers over a period of time; means for determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies; means for determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and means for outputting an indication of the determined breathing rate.

Clause 23. The apparatus of clause 23, wherein: the means for obtaining the CSI comprise means for receiving the CSI at a first antenna and a second antenna, and the means for extracting phase information of the CSI comprise means for determining a phase difference between the CSI received at the first antenna and the CSI received at the second antenna.

Clause 24. The apparatus of any one of clauses 22-23 wherein the subcarrier set comprises a single subcarrier, and wherein the apparatus further comprises means for selecting the single subcarrier from the plurality of subcarriers, based on a Breathing to Noise Ratio (BNR) of the single subcarrier, wherein the BNR for each subcarrier of the plurality of subcarriers comprises a ratio of energy within the predetermined range to total energy, with respect to the frequency spectrum of the CSI corresponding to the respective subcarrier.

Clause 25. The apparatus of any one of clauses 22-23 wherein the subcarrier set comprises a subset of two or more subcarriers of the plurality of subcarriers, and wherein the apparatus further comprises means for selecting the subset at least in part by determining that, for each subcarrier of the subset, there is more energy within the predetermined range than outside the predetermined range in the frequency spectrum of the CSI corresponding to the respective subcarrier.

Clause 26. The apparatus of clause 25 wherein the means for determining the breathing rate comprises: means for determining a histogram from local maximum phase change values in the predetermined range of the frequency spectrum of the CSI corresponding to the subcarriers in the subset; means for identifying a range within the histogram having a largest number of local maximum phase change values; and means for determining the breathing rate as a mode of local maximum phase change values within the identified range.

Clause 27. The apparatus of clause 26 wherein the means for determining a histogram from local maximum phase change values comprises means for, for each subcarrier in the subset, using up to a predetermined number of local maximum phase change values in the predetermined range of the frequency spectrum of the CSI corresponding to the respective subcarrier.

Clause 28. The apparatus of any one of clauses 22-23 wherein the subcarrier set comprises all subcarriers of the plurality of subcarriers, and wherein: the means for determining the frequency spectrum for each subcarrier of the plurality of subcarriers comprises means for determining a power spectral density (PSD) for each subcarrier of the plurality of subcarriers; and the means for determining the breathing rate from the frequency spectrum comprises means for determining the breathing rate to correspond to a frequency of a local maximum value, within the predetermined range, of a sum of the PSDs for all subcarriers of the plurality of subcarriers.

Clause 29. The apparatus of clause 28 wherein the means for determining the breathing rate to correspond to the frequency of the local maximum value comprises means for identifying the local maximum value, from a plurality of local maximum values, as corresponding to one or more previously determined breathing rates.

Clause 30. A non-transitory computer-readable medium storing instructions for radio frequency (RF) sensing for breathing rate determination, the instructions comprising code for: obtaining channel state information (CSI) corresponding to each subcarrier of a plurality of subcarriers in a set of RF transmissions comprising at least the plurality of subcarriers; extracting phase information of the CSI corresponding to each subcarrier of the plurality of subcarriers over a period of time; determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies; determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and outputting an indication of the determined breathing rate.

What is claimed is:

1. A method of radio frequency (RF) sensing for breathing rate determination, the method comprising:
   obtaining channel state information (CSI) corresponding to each subcarrier of a plurality of subcarriers in a set of RF transmissions comprising at least the plurality of subcarriers;
   extracting phase information of the CSI corresponding to each subcarrier of the plurality of subcarriers over a period of time;
   determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies;
   determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and
   outputting an indication of the determined breathing rate.

2. The method of claim 1, wherein:
   obtaining the CSI comprises receiving the CSI at a first antenna and a second antenna, and
   extracting phase information of the CSI comprises determining a phase difference between the CSI received at the first antenna and the CSI received at the second antenna.

3. The method of claim 1, wherein the subcarrier set comprises a single subcarrier, and wherein the method further comprises selecting the single subcarrier from the plurality of subcarriers, based on a Breathing to Noise Ratio (BNR) of the single subcarrier, wherein the BNR for each subcarrier of the plurality of subcarriers comprises a ratio of energy within the predetermined range to total energy, with respect to the frequency spectrum of the CSI corresponding to the respective subcarrier.

4. The method of claim 3, wherein selecting the single subcarrier is based on a determination that the single subcarrier has the highest BNR of all subcarriers in the plurality of subcarriers.

5. The method of claim 1, wherein the subcarrier set comprises a subset of two or more subcarriers of the plurality of subcarriers, and wherein the method further comprises selecting the subset at least in part by determining that, for each subcarrier of the subset, there is more energy within the predetermined range than outside the predetermined range in the frequency spectrum of the CSI corresponding to the respective subcarrier.

6. The method of claim 5, wherein determining the breathing rate comprises:
   determining a histogram from local maximum phase change values in the predetermined range of the frequency spectrum of the CSI corresponding to the subcarriers in the subset;
   identifying a range within the histogram having a largest number of local maximum phase change values; and
   determining the breathing rate as a mode of local maximum phase change values within the identified range.

7. The method of claim 6, wherein determining a histogram from local maximum phase change values comprises, for each subcarrier in the subset, using up to a predetermined number of local maximum phase change values in the predetermined range of the frequency spectrum of the CSI corresponding to the respective subcarrier.

8. The method of claim 6, wherein, for each subcarrier in the subset, the local maximum phase change values in the predetermined range of the frequency spectrum of the CSI corresponding to the respective subcarrier exceed a minimum threshold value.

9. The method of claim 1, wherein the subcarrier set comprises all subcarriers of the plurality of subcarriers, and wherein:

determining the frequency spectrum for each subcarrier of the plurality of subcarriers comprises determining a power spectral density (PSD) for each subcarrier of the plurality of subcarriers; and determining the breathing rate from the frequency spectrum comprises determining the breathing rate to correspond to a frequency of a local maximum value, within the predetermined range, of a sum of the PSDs for all subcarriers of the plurality of subcarriers.

10. The method of claim 9, wherein determining the breathing rate to correspond to the frequency of the local maximum value comprises identifying the local maximum value, from a plurality of local maximum values, as corresponding to one or more previously determined breathing rates.

11. The method of claim 1, wherein the set of RF transmissions comprise Wi-Fi transmissions.

12. A device comprising:

a memory; and one or more processors communicatively coupled with the memory, wherein the one or more processors are configured to:

obtain channel state information (CSI) corresponding to each subcarrier of a plurality of subcarriers in a set of RF transmissions comprising at least the plurality of subcarriers;

extract phase information of the CSI corresponding to each subcarrier of the plurality of subcarriers over a period of time;

determine, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies;

determine a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and output an indication of the determined breathing rate.

13. The device of claim 12, wherein:

to obtain the CSI, the one or more processors are configured to obtain CSI received at a first antenna and a second antenna, and to extract phase information of the CSI, the one or more processors are configured to determine a phase difference between the CSI received at the first antenna and the CSI received at the second antenna.

14. The device of claim 12, wherein the subcarrier set comprises a single subcarrier, and wherein the one or more processors are configured to select the single subcarrier from the plurality of subcarriers based on a Breathing to Noise Ratio (BNR) of the single subcarrier, wherein the BNR for each subcarrier of the plurality of subcarriers comprises a ratio of energy within the predetermined range to total energy, with respect to the frequency spectrum of the CSI corresponding to the respective subcarrier.

15. The device of claim 14, wherein the one or more processors are configured to select the single subcarrier based on a determination that the single subcarrier has the highest BNR of all subcarriers in the plurality of subcarriers.

16. The device of claim 12, wherein the subcarrier set comprises a subset of two or more subcarriers of the plurality of subcarriers, and wherein the one or more processors are configured to select the subset at least in part by determining that, for each subcarrier of the subset, there is more energy within the predetermined range than outside the predetermined range in the frequency spectrum of the CSI corresponding to the respective subcarrier.

17. The device of claim 16, wherein, to determine the breathing rate, the one or more processors are configured to:

determine a histogram from local maximum phase change values in the predetermined range of the frequency spectrum of the CSI corresponding to the subcarriers in the subset;

identify a range within the histogram having a largest number of local maximum phase change values; and determine the breathing rate as a mode of local maximum phase change values within the identified range.

18. The device of claim 17, wherein, to determine a histogram from local maximum phase change values, the one or more processors are configured to, for each subcarrier in the subset, use up to a predetermined number of local maximum phase change values in the predetermined range of the frequency spectrum of the CSI corresponding to the respective subcarrier.

19. The device of claim 17, wherein, for each subcarrier in the subset, the local maximum phase change values in the predetermined range of the frequency spectrum of the CSI corresponding to the respective subcarrier exceed a minimum threshold value.

20. The device of claim 12, wherein the subcarrier set comprises all subcarriers of the plurality of subcarriers, and wherein:

to determine the frequency spectrum for each subcarrier of the plurality of subcarriers, the one or more processors are configured to determine a power spectral density (PSD) for each subcarrier of the plurality of subcarriers; and to determine the breathing rate from the frequency spectrum, the one or more processors are configured to determine the breathing rate to correspond to a frequency of a local maximum value, within the predetermined range, of a sum of the PSDs for all subcarriers of the plurality of subcarriers.

21. The device of claim 20, wherein, to determine the breathing rate to correspond to the frequency of the local maximum value, the one or more processors are configured to identify the local maximum value, from a plurality of local maximum values, as corresponding to one or more previously determined breathing rates.

22. An apparatus for radio frequency (RF) sensing for breathing rate determination, the apparatus comprising:

means for obtaining channel state information (CSI) corresponding to each subcarrier of a plurality of subcarriers in a set of RF transmissions comprising at least the plurality of subcarriers;

extracting phase information of the CSI corresponding to each subcarrier of the plurality of subcarriers over a period of time;

means for determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies;

means for determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and means for outputting an indication of the determined breathing rate.

23. The apparatus of claim 22, wherein:

the means for obtaining the CSI comprise means for receiving the CSI at a first antenna and a second antenna, and the means for extracting phase information of the CSI comprise means for determining a phase difference between the CSI received at the first antenna and the CSI received at the second antenna.

24. The apparatus of claim 22, wherein the subcarrier set comprises a single subcarrier, and wherein the apparatus further comprises means for selecting the single subcarrier from the plurality of subcarriers, based on a Breathing to Noise Ratio (BNR) of the single subcarrier, wherein the BNR for each subcarrier of the plurality of subcarriers comprises a ratio of energy within the predetermined range to total energy, with respect to the frequency spectrum of the CSI corresponding to the respective subcarrier.

25. The apparatus of claim 22, wherein the subcarrier set comprises a subset of two or more subcarriers of the plurality of subcarriers, and wherein the apparatus further comprises means for selecting the subset at least in part by determining that, for each subcarrier of the subset, there is more energy within the predetermined range than outside the predetermined range in the frequency spectrum of the CSI corresponding to the respective subcarrier.

26. The apparatus of claim 25, wherein the means for determining the breathing rate comprises:

means for determining a histogram from local maximum phase change values in the predetermined range of the frequency spectrum of the CSI corresponding to the subcarriers in the subset;

means for identifying a range within the histogram having a largest number of local maximum phase change values; and means for determining the breathing rate as a mode of local maximum phase change values within the identified range.

27. The apparatus of claim 26, wherein the means for determining a histogram from local maximum phase change values comprises means for, for each subcarrier in the subset, using up to a predetermined number of local maximum phase change values in the predetermined range of the frequency spectrum of the CSI corresponding to the respective subcarrier.

28. The apparatus of claim 22, wherein the subcarrier set comprises all subcarriers of the plurality of subcarriers, and wherein:

the means for determining the frequency spectrum for each subcarrier of the plurality of subcarriers comprises means for determining a power spectral density (PSD) for each subcarrier of the plurality of subcarriers; and the means for determining the breathing rate from the frequency spectrum comprises means for determining the breathing rate to correspond to a frequency of a local maximum value, within the predetermined range, of a sum of the PSDs for all subcarriers of the plurality of subcarriers.

29. The apparatus of claim 28, wherein the means for determining the breathing rate to correspond to the frequency of the local maximum value comprises means for identifying the local maximum value, from a plurality of local maximum values, as corresponding to one or more previously determined breathing rates.

30. A non-transitory computer-readable medium storing instructions for radio frequency (RF) sensing for breathing rate determination, the instructions comprising code for:

obtaining channel state information (CSI) corresponding to each subcarrier of a plurality of subcarriers in a set of RF transmissions comprising at least the plurality of subcarriers;

extracting phase information of the CSI corresponding to each subcarrier of the plurality of subcarriers over a period of time;

determining, for each subcarrier of the plurality of subcarriers, a frequency spectrum from the phase information of the CSI corresponding to the respective subcarrier, the frequency spectrum comprising phase change values of the CSI corresponding to the respective subcarrier for a plurality of frequencies;

determining a breathing rate from the frequency spectrum of the CSI corresponding to a subcarrier set comprising one or more subcarriers of the plurality of subcarriers, the breathing rate corresponding to a phase change value in the frequency spectrum within a predetermined range of frequencies for breathing rates; and outputting an indication of the determined breathing rate.

* * * * *